US012500773B2

(12) United States Patent
Imanishi

(10) Patent No.: US 12,500,773 B2
(45) Date of Patent: Dec. 16, 2025

(54) IMAGING APPARATUS, INFORMATION PROCESSING APPARATUS, INFORMATION PROCESSING METHOD, AND PROGRAM

(71) Applicant: SONY GROUP CORPORATION, Tokyo (JP)

(72) Inventor: Masayuki Imanishi, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 226 days.

(21) Appl. No.: 17/914,103

(22) PCT Filed: Mar. 16, 2021

(86) PCT No.: PCT/JP2021/010490
§ 371 (c)(1),
(2) Date: Sep. 23, 2022

(87) PCT Pub. No.: WO2021/200092
PCT Pub. Date: Oct. 7, 2021

(65) Prior Publication Data
US 2024/0214209 A1 Jun. 27, 2024

(30) Foreign Application Priority Data

Mar. 30, 2020 (JP) ................. 2020-060928

(51) Int. Cl.
H04L 29/00 (2006.01)
G06T 3/4023 (2024.01)
(Continued)

(52) U.S. Cl.
CPC .......... H04L 9/3236 (2013.01); G06T 3/4023 (2013.01); G06V 10/25 (2022.01); H04L 9/0825 (2013.01); H04L 9/3247 (2013.01)

(58) Field of Classification Search
CPC ... H04L 9/3236; H04L 9/0825; H04L 9/3247; H04L 9/0643; H04L 9/3239;
(Continued)

(56) References Cited

U.S. PATENT DOCUMENTS 8,392,975 B1* 3/2013 Raghunath .............. G06F 21/36
726/19
8,971,691 B2 3/2015 Yoshioka
(Continued)

FOREIGN PATENT DOCUMENTS

CN 108781270 A 11/2018
JP 2008-022372 A 1/2008
(Continued)

Primary Examiner — Ghazal B Shehni
(74) Attorney, Agent, or Firm — Paratus Law Group, PLLC

(57) ABSTRACT

There is provided an imaging apparatus, an information processing apparatus, an information processing method, and a program that are intended to suppress an increase in a load. A captured image is linked with a hash value for a part of the captured image and part identification information for identifying the part. Further, the part of the captured image is extracted from the captured image in reference to the part identification information for identifying the part, the part identification information being linked with the captured image along with the hash value for the part and the part identification information, a hash value for the part extracted and the part identification information is generated, and the hash value generated is compared with the hash value linked with the captured image. The present disclosure can be applied to, for example, an image processing apparatus, an information processing apparatus, an imaging apparatus, electronic equipment, an information processing method, a program, or the like.

15 Claims, 16 Drawing Sheets

(51) Int. Cl.
  *G06V 10/25* (2022.01)
  *H04L 9/08* (2006.01)
  *H04L 9/32* (2006.01)

(58) Field of Classification Search
  CPC ..... H04L 9/3263; G06T 3/4023; G06V 10/25; G06F 21/645; H04N 5/9201; H04N 5/77
  See application file for complete search history.

(56) References Cited

U.S. PATENT DOCUMENTS

| | | | |
|---|---|---|---|
| 10,375,050 | B2 | 8/2019 | Lyons |
| 2012/0237180 | A1* | 9/2012 | Yoshioka ............... H04N 1/215 |
| | | | 386/E9.011 |
| 2012/0288204 | A1* | 11/2012 | Igarashi ............... H04N 19/124 |
| | | | 382/195 |
| 2017/0206523 | A1* | 7/2017 | Goeringer ............ G06Q 20/409 |
| 2019/0109834 | A1* | 4/2019 | Lyons .................. H04L 9/3242 |
| 2019/0378142 | A1* | 12/2019 | Darnell ............... H04L 63/0861 |
| 2020/0099926 | A1* | 3/2020 | Tanner .................. H04N 19/97 |
| 2020/0193609 | A1* | 6/2020 | Dharur .................... G06T 7/143 |
| 2020/0344064 | A1* | 10/2020 | Roscoe ................ H04L 9/3239 |
| 2020/0372184 | A1* | 11/2020 | Meirosu ............... H04L 9/3247 |

FOREIGN PATENT DOCUMENTS

| | | |
|---|---|---|
| JP | 2020-022150 A | 2/2020 |
| WO | WO 2015/115074 A1 | 8/2015 |
| WO | WO 2017/022121 A1 | 2/2017 |

* cited by examiner

IMAGING APPARATUS, INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2021/010490 (filed on Mar. 16, 2021) under 35 U.S.C. § 371, which claims priority to Japanese Patent Application No. 2020-060928 (filed on Mar. 30, 2020), which are all hereby incorporated by reference in their entirety.

TECHNICAL FIELD

The present disclosure relates to an imaging apparatus, an information processing apparatus, an information processing method, and a program, and in particular, to an imaging apparatus, an information processing apparatus, an information processing method, and a program that are intended to suppress an increase in a load.

BACKGROUND ART

In the known art, there has been proposed a method in which a digital camera or the like converts a captured image or the like into a hash value and links the captured image with an electronic signature using the hash value, thereby using the electronic signature for detection of falsification (see, for example, PTL 1).

CITATION LIST

Patent Literature

[PTL 1]
Japanese Paten Laid-open No. 2008-22372

SUMMARY

Technical Problem

The present disclosure is intended to suppress such an increase in a load caused by linking of electronic signature.

Solution to Problem

An imaging apparatus according to an aspect of the present technology is an imaging apparatus including a linking section that links a captured image with a hash value for a part of the captured image and part identification information for identifying the part.

An information processing method according to an aspect of the present technology is an information processing method including linking a captured image with a hash value for a part of the captured image and part identification information for identifying the part.

A program according to an aspect of the present technology is a program causing functioning as a linking section that links a captured image with a hash value for a part of the captured image and part identification information for identifying the part.

An information processing apparatus according to another aspect of the present technology is an imaging apparatus including an extraction section that extracts a part of a captured image from the captured image in reference to part identification information for identifying the part, the part identification information being linked with the captured image along with a hash value for the part and the part identification information, a hash value generation section that generates a hash value for the part extracted by the extraction section and the part identification information, and a comparison section that compares the hash value generated by the hash value generation section with the hash value linked with the captured image.

An information processing method according to another aspect of the present technology is an information processing method including extracting a part of a captured image from the captured image in reference to part identification information for identifying the part, the part identification information being linked with the captured image along with a hash value for the part and the part identification information, generating a hash value for the part extracted and the part identification information, and comparing the hash value generated with the hash value linked with the captured image.

A program according to another aspect of the present technology is a program causing a computer to function as an extraction section that extracts a part of a captured image from the captured image in reference to part identification information for identifying the part, the part identification information being linked with the captured image along with a hash value for the part and the part identification information, a hash value generation section that generates a hash value for the part extracted by the extraction section and the part identification information, and a comparison section that compares the hash value generated by the hash value generation section with the hash value linked with the captured image.

In the imaging apparatus, the information processing method, and the program according to an aspect of the present technology, the captured image is linked with the hash value for a part of the captured image and part identification information for identifying the part.

In the information processing apparatus, the information processing method, and the program according to another aspect of the present technology, a part of the captured image is extracted from the captured image in reference to the part identification information for identifying the part, the part identification information being linked with the captured image along with the hash value for the part and the part identification information, the hash value for the part extracted and the part identification information is generated, and the hash value generated is compared with the hash value linked with the captured image.

BRIEF DESCRIPTION OF DRAWINGS

FIG. 6 is a block diagram depicting a main configuration example of a verification apparatus and the like.

DESCRIPTION OF EMBODIMENTS

Figure 1:
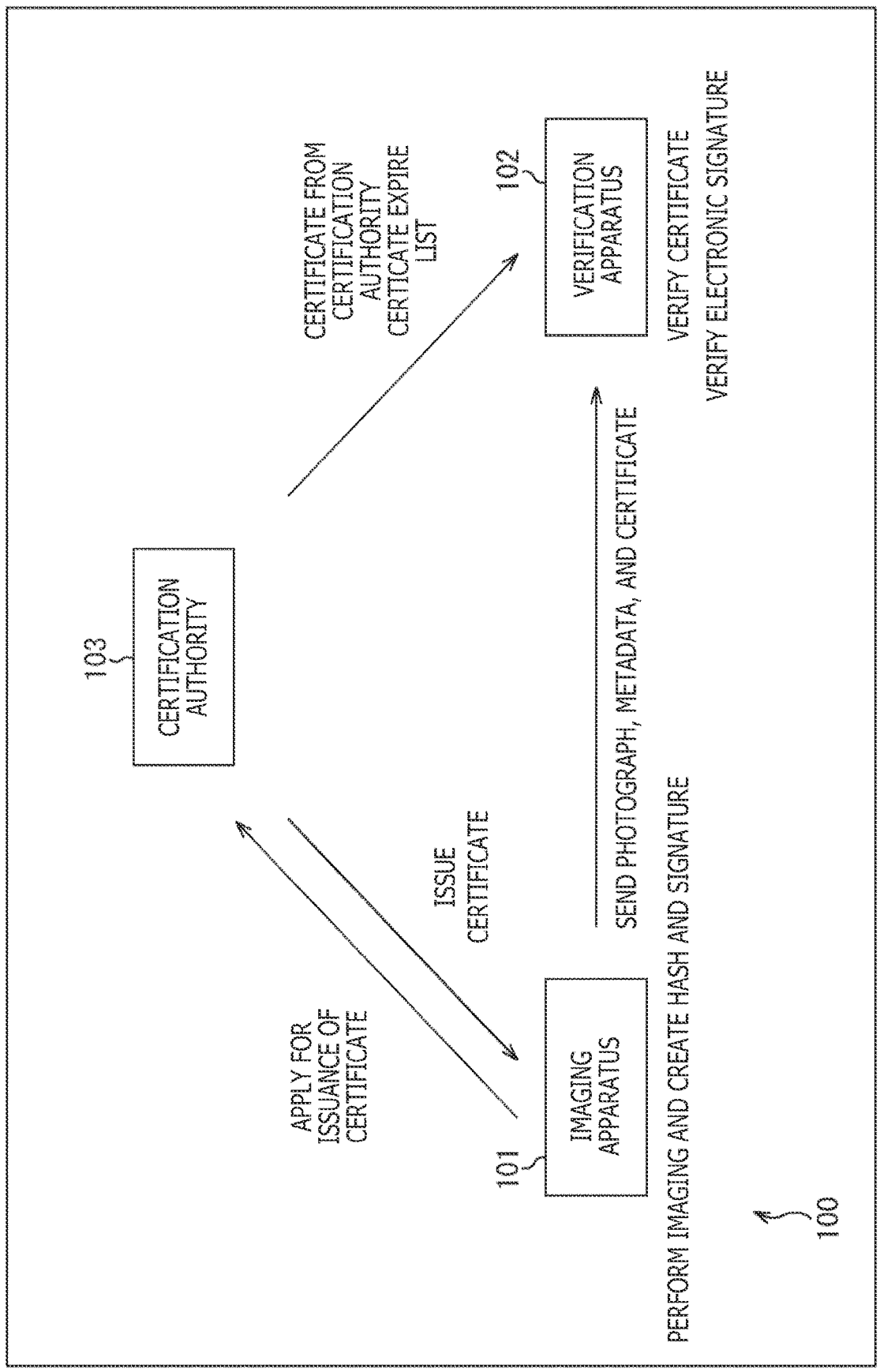
FIG. 1 is a diagram depicting a main configuration example of a falsification detection system.

Forms for implementing the present disclosure (hereinafter referred to as embodiments) will be described below. Note that the description is given in the following order.
1. Generation of Hash for Partial Image
2. First Embodiment (Identification of Partial Region Based on Focus Information)
3. Second Embodiment (Identification of Partial Region Based on Image Analysis Result)
4. Third Embodiment (Case of Moving Image)
5. Fourth Embodiment (Control Depending on Imaging Mode)
6. Supplementary Note 1. Generation of Hash for Partial Image <Generation of Hash>

For example, PTL 1 describes a method in which a digital camera or the like generates a hash for the entire captured image and uses the hash to associate an electronic signature with the captured image, thereby using the electronic signature for detection of falsification. For example, information regarding the imaging apparatus can also be included in the electronic signature.

However, in recent years, improved information processing technologies have the tendency to increase the amount of data for the imaging apparatus. Such an increased amount of data for the imaging apparatus tends to increase a load on processing for generating a hash for the entire captured image. This increases processing time related to generation of the electronic signature, and in a case where multiple captured images are generated in a short period of time particularly in a continuous shooting imaging mode or a moving image imaging mode, the processing for generating an electronic signature may not be performed in time.

Hence, a hash for a part of the captured image is generated and used to detect falsification. This enables suppression of an increase in the amount of data of a target (image) for which the hash is to be generated, thus allowing suppression of an increase in the load related to generation of the electronic signature.

For example, a hash value for a part of the captured image and part identification information for identifying the part is linked with the captured image. This allows suppression of an increase in the load related to generation of the electronic signature to suppress an increase in processing time for the electronic signature.

The part for which the hash is generated may be any part of the captured image. For example, the part may be a more important part of the captured image. In other words, the important part of the captured image is identified, the identified part is extracted from the captured image, a hash is generated for the extracted image, and the hash is used for generation of an electronic signature. This allows authenticity of the important part of the captured image to be ensured, while an increase in the load is suppressed.

A reference for the important part of the captured image is optional. For example, the important part may be a part of the captured image focused on a subject (also referred to as a focused part). For example, focus information (for example, depth data including a depth map, distance measurement information, and the like) indicating the focal position of the captured image may be used to identify the focused part, the focused part identified may be extracted, and a hash may be generated. This allows the authenticity of the focused part of the captured image to be ensured, while an increase in the load is suppressed.

Further, for example, the important part may be a partial region of a predetermined position in the captured image. For example, the important part may be a partial region at a position where an important subject is likely to be present. For example, the important part may be a partial region near the center of the captured image. Further, the important part may be a partial region close to any of four corners of the captured image. Further, the important part may be a partial region randomly selected from multiple partial regions at different positions such as regions near the center and the four corners of the captured image. This allows the authenticity of the partial region at the predetermined position in the captured image to be ensured, while an increase in the load is suppressed.

Further, for example, the important part may be a part of the captured image resulting from decimation of some pixels from the captured image. For example, the important part may be an image obtained by decimating any pixels from the captured image at a predetermined rate. For example, the important part may be an image resulting from decimation of pixels from the captured image with a 4K resolution into an HD resolution. Further, for example, the important part may be an image resulting from decimation of any pixel columns (or pixel rows) from the captured image at a predetermined rate. This allows authenticity to be ensured for a range substantially similar to the entire captured image while an increase in the load is suppressed.

Further, image analysis may be performed on the captured image to identify the important part. For example, image analysis may be performed on the captured image to identify a part of the captured image in which an important subject is present, the identified part may be extracted as an important part, and a hash may be generated for the important part. For example, image analysis may be performed to identify a subject (person), and a region of the captured image in which the person is present may be designated as an important part. Needless to say, the subject to be detected is optional and is not limited to a person. For example, the subject to be detected may be a face of the person or a site other than the face. Further, the subject to be detected may be an animal or a plant. Furthermore, the subject to be detected may be inorganic matter such as a building. This allows ensuring of authenticity of a part of the captured image in which the important subject appears, while suppressing an increase in the load.

Further, in a case where the captured image is a moving image, for only I frames of the moving image, the captured image may be associated with the hash value for a part of the captured image and the part identification information for identifying the part. This allows the authenticity of the important part to be ensured for I frames having larger amount of data, while an increase in the load is suppressed.

Further, in a case where the captured image is a moving image, for only frames of the moving image which involve intense movement (for example, frames between which the movement is more intense than a predetermined value (higher than a threshold) (movement from the preceding frame is more intense than the predetermined threshold)), the captured image may be associated with the hash value for a part of the captured image and the part identification information for identifying the part. This allows, for more important frames with intense movement, the authenticity of the important part to be ensured, while an increase in the load is suppressed.

Further, in a case where the imaging mode is a continuous shooting mode, the captured image may be associated with the hash value for a part of the captured image and the part identification information for identifying the part, and in a case where the imaging mode is not the continuous shooting mode, the captured image may be associated with the hash value for the entire captured image. This allows an increase in processing time to be suppressed for the continuous shooting mode, which has a short processing time.

Note that the hash value may be generated using a part of the captured image and the part identification information for identifying the part. Moreover, the hash value generated may be linked with the captured image. Further, an electronic signature including the hash value may be generated, and the electronic signature generated may be linked with the captured image.

Further, the part identification information for identifying the part may be used to update metadata for the captured image, and the updated metadata may be linked with the captured image. Further, the captured image may be associated with a public key used to generate the electronic signature and a certificate for the public key.

Further, a part of the captured image may be extracted from the captured image in reference to the part identification information for identifying the part, the part identification information being linked with the captured image along with the hash value for the part and the part identification information, the hash value for the part extracted and the part identification information may be generated, and the hash value generated may be compared with the hash value linked with the captured image. This allows suppression of an increase in the load related to verification of the electronic signature generated using the hash for the part of the captured image.

2. First Embodiment

<Falsification Detection System>

FIG. 1 is a diagram depicting a main configuration example of a falsification detection system corresponding to an embodiment of an information processing system to which the present technology is applied. A falsification detection system 100 depicted in FIG. 1 is a system that detects falsification of a captured image or the like. As depicted in FIG. 1, the falsification detection system 100 includes, for example, an imaging apparatus 101, a verification apparatus 102, and a certification authority 103. Note that FIG. 1 depicts one imaging apparatus 101, one verification apparatus 102, and one certification authority 103 but the numbers of imaging apparatuses 101, the verification apparatuses 102, and certification authorities 103, constituting the falsification detection system 100, are each optional.

For example, the imaging apparatus 101, the verification apparatus 102, and the certification authority 103 may be provided in plural number.

The imaging apparatus 101, the verification apparatus 102, and the certification authority 103 are connected to one another in a manner allowing communication therebetween, for example, via a network not illustrated. The imaging apparatus 101 executes processing related to imaging of a subject (generation of a captured image), generation of a hash for the captured image, generation of a signature to be associated with the captured image, and the like. Moreover, the imaging apparatus 101 applies for issuance of a certificate with the certification authority 103, causes the certification authority 103 to issue the certificate, and acquires the certificate. Furthermore, the imaging apparatus 101 can transmit the captured image (photograph), metadata of the captured image, and the like to the verification apparatus 102.

The verification apparatus 102 executes processing related to detection of falsification of the captured image generated in the imaging apparatus 101. For example, the verification apparatus 102 may acquire a captured image (photograph) and metadata of the captured image fed from the imaging apparatus 101. Further, the verification apparatus 102 can verify the electronic signature.

The certification authority 103 can issue a certificate for the captured image. Moreover, the certification authority 103 can distribute, to the verification apparatus 102, a certificate from the certification authority and a certificate expire list. In reference to the certificate from the certification authority and the certificate expire list, the verification apparatus 102 can verify the certificate used by the imaging apparatus 101. Note that the "linking" of pieces of data herein refers to "associating" of pieces of data with each other. The term "associating" as used herein means that when one of the pieces of data is processed, the other piece of data may be used (may be linked with the one of the pieces of data). In other words, pieces of data associated with each other may be compiled into one piece of data or may be used as separate pieces of data. For example, multiple pieces of information associated with one another may be transmitted on different transmission paths. Further, for example, multiple pieces information associated with one another may be recorded in different recording media (or different recording areas in the same recording medium). Note that the "associating" may be intended for a part of the data rather than the entire data. For example, an image and information corresponding to the image may be associated with each other in any units such as multiple frames, one frame, or a portion within a frame. Note that, in the specification, besides the "linking" described above, for example, such terms as "synthesizing," "multiplexing," "adding," "integrating," "including," "storing," "putting into," "plugging into," and "inserting" mean organizing multiple objects into one and mean one method for the "associating" described above.

<Data>

Figure 2:
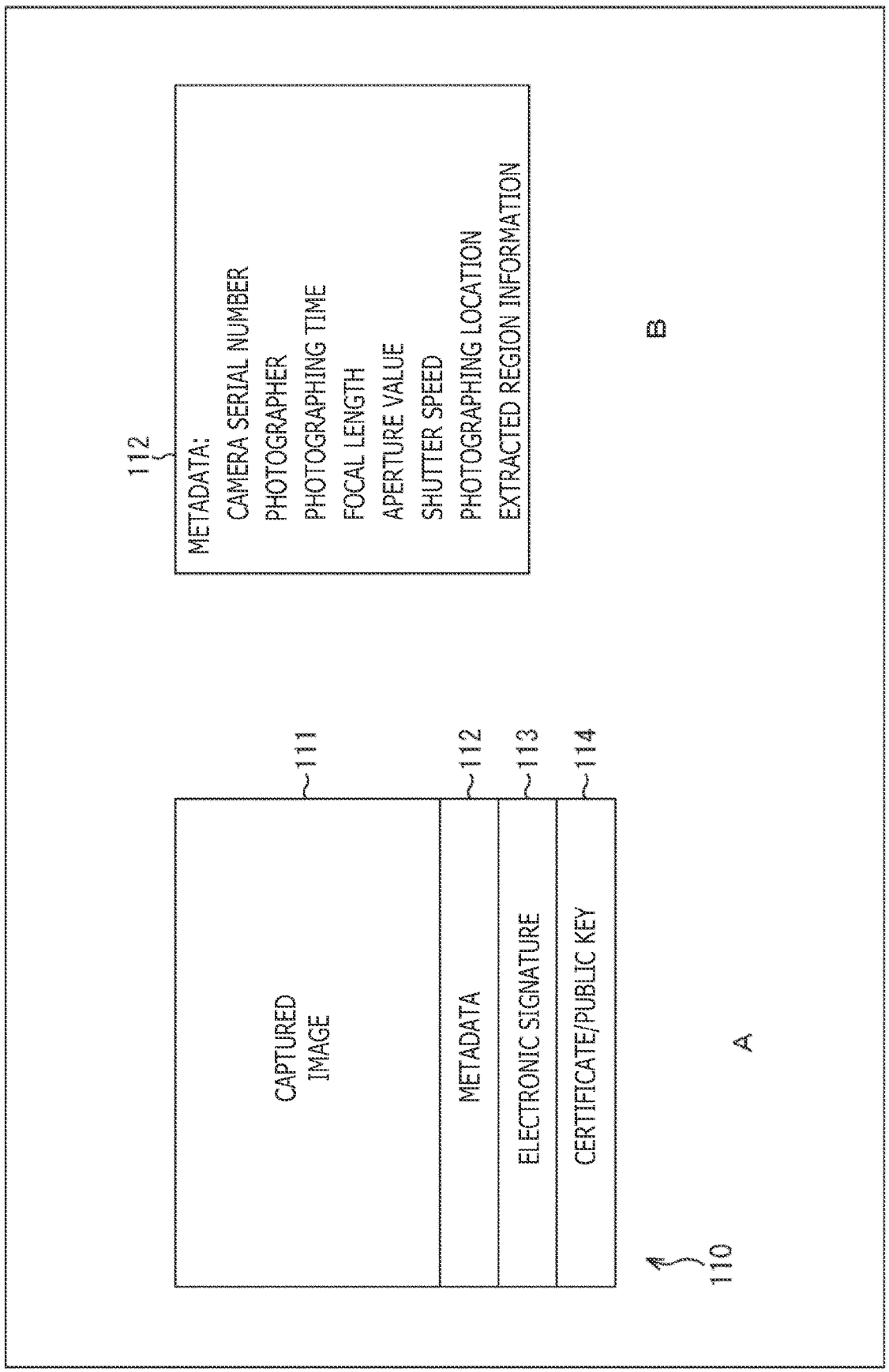
FIG. 2 depicts diagrams illustrating an example of information transmitted and received between apparatuses.

FIG. 2 is a diagram depicting an example of data fed from the imaging apparatus 101 to the verification apparatus 102. As depicted in A of FIG. 2, a captured image 111 is associated with such information as metadata 112, an electronic signature 113, and a certificate/public key 114.

An example of the metadata 112 is depicted in B of FIG. 2. As depicted in B of FIG. 2, the metadata 112 includes the serial number of a camera, a photographer, a photographing time, a focal length, an aperture value, a shutter speed, a photographing location, and the like. Furthermore, the metadata 112 also includes extracted region information.

<Imaging Apparatus>

Figure 3:
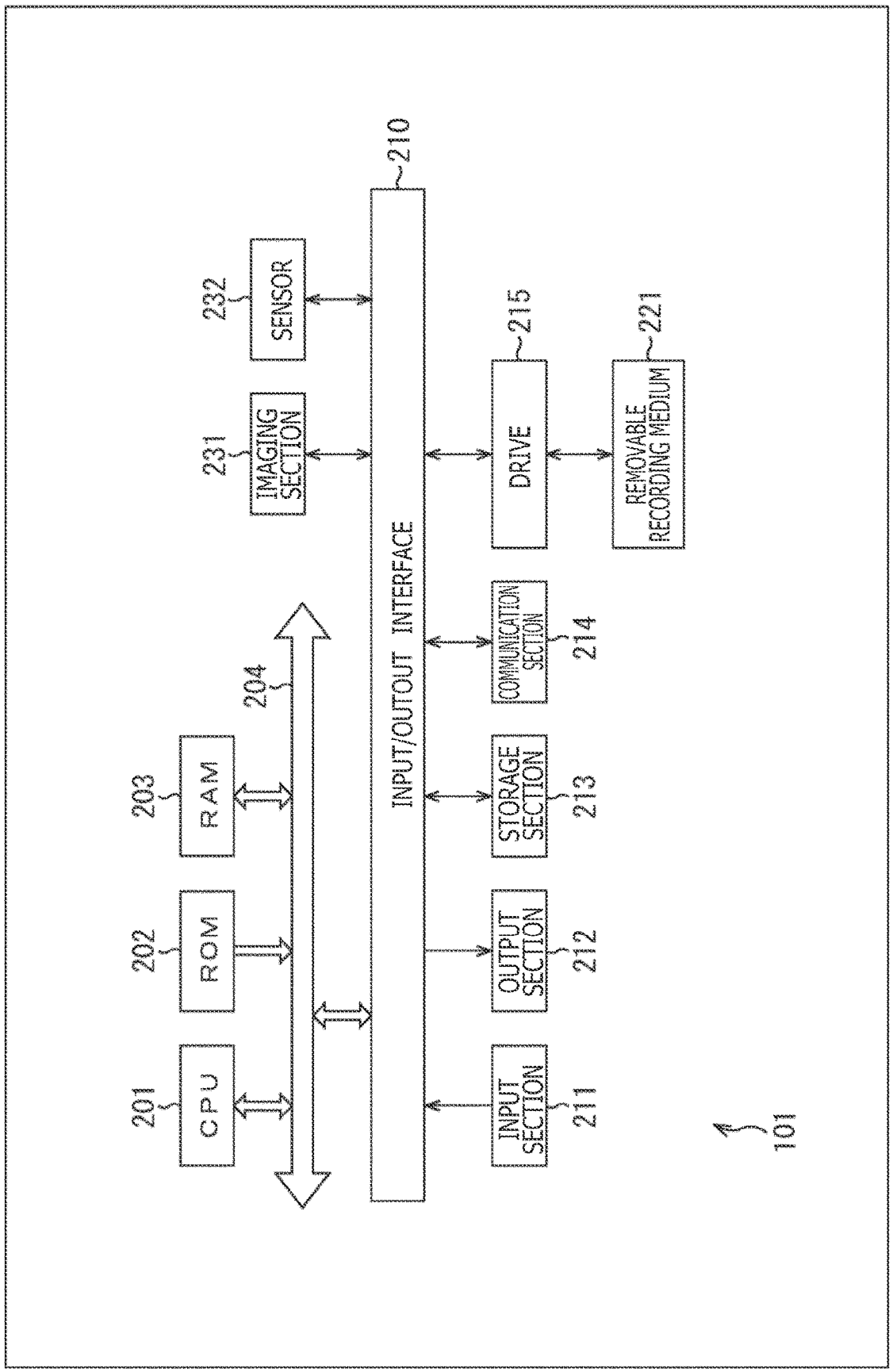
FIG. 3 is a block diagram depicting a main configuration example of an imaging apparatus.

FIG. 3 is a diagram depicting a main configuration example of the imaging apparatus 101 corresponding to an embodiment of the information processing apparatus to which the present technology is applied. The imaging apparatus 101 depicted in FIG. 3 is a computer in which an application program (software) for performing processing related to imaging (generation of a captured image), generation of an electronic signature, and the like is installed and executed. Here, examples of the computer include a computer integrated into dedicated hardware, for example, a general-purpose personal computer in which various programs are installed and which can execute various functions, and the like. In other words, the imaging apparatus 101 executes the application programs to perform processing related to imaging (generation of a captured image), generation of an electronic signature, and the like.

In the imaging apparatus 101 depicted in FIG. 3, a CPU (Central Processing Unit) 201, a ROM (Read Only Memory) 202, and a RAM (Random Access Memory) are connected to one another via a bus 204.

An input/output interface 210 is also connected to the bus 204. The input/output interface 210 connects to an input section 211, an output section 212, a storage section 213, a communication section 214, and a drive 215.

The input section 211 includes, for example, a keyboard, a mouse, a microphone, a touch panel, an input terminal, and the like. The output section 212 includes, for example, a display, a speaker, an output terminal, and the like. The storage section 213 includes, for example, a hard disk, a RAM disk, a nonvolatile memory, and the like. The communication section 214 includes, for example, a network interface. The drive 215 drives a removable recording medium 221 such as a magnetic disk, an optical disk, a magneto-optical disk, or a semiconductor memory.

Further, an imaging section 231 and a sensor 232 are connected to the input/output interface 210.

The imaging section 231 includes, for example, an optical system, such as a lens and a diaphragm, and an image sensor, and images a subject to generate a captured image. Note that the imaging section 231 may further include components other than those described above, such as an image processing section that executes image processing on the captured image generated and a memory that stores the data regarding the captured image.

The sensor 232 includes, for example, a distance measurement sensor or the like to measure the distance to the subject. Note that the sensor 232 may generate a depth map and the like.

In the imaging apparatus 101 configured as described above, the CPU 201 loads into the RAM 203 and executes, for example, an application program stored in the storage section 213, via the input/output interface 210 and the bus 204, thus performing a series of processing operations described above. The RAM 203 also appropriately stores data required for the CPU 201 to execute various processing operations, for example.

The application program executed by the imaging apparatus 101 can be recorded in the removable recording medium 221, used as a package medium or the like, for example, for application. In that case, the application program can be installed in the storage section 213 via the input/output interface 210 by mounting the removable recording medium 221 in the drive 215.

In addition, the application program can be provided via a wired or wireless transmission medium such as a local area network, the Internet, or digital broadcasting. In that case, the application program can be received by the communication section 214 and installed in the storage section 213.

Alternatively, the application program can be installed in the ROM 202 or the storage section 213 in advance.

Figure 4:
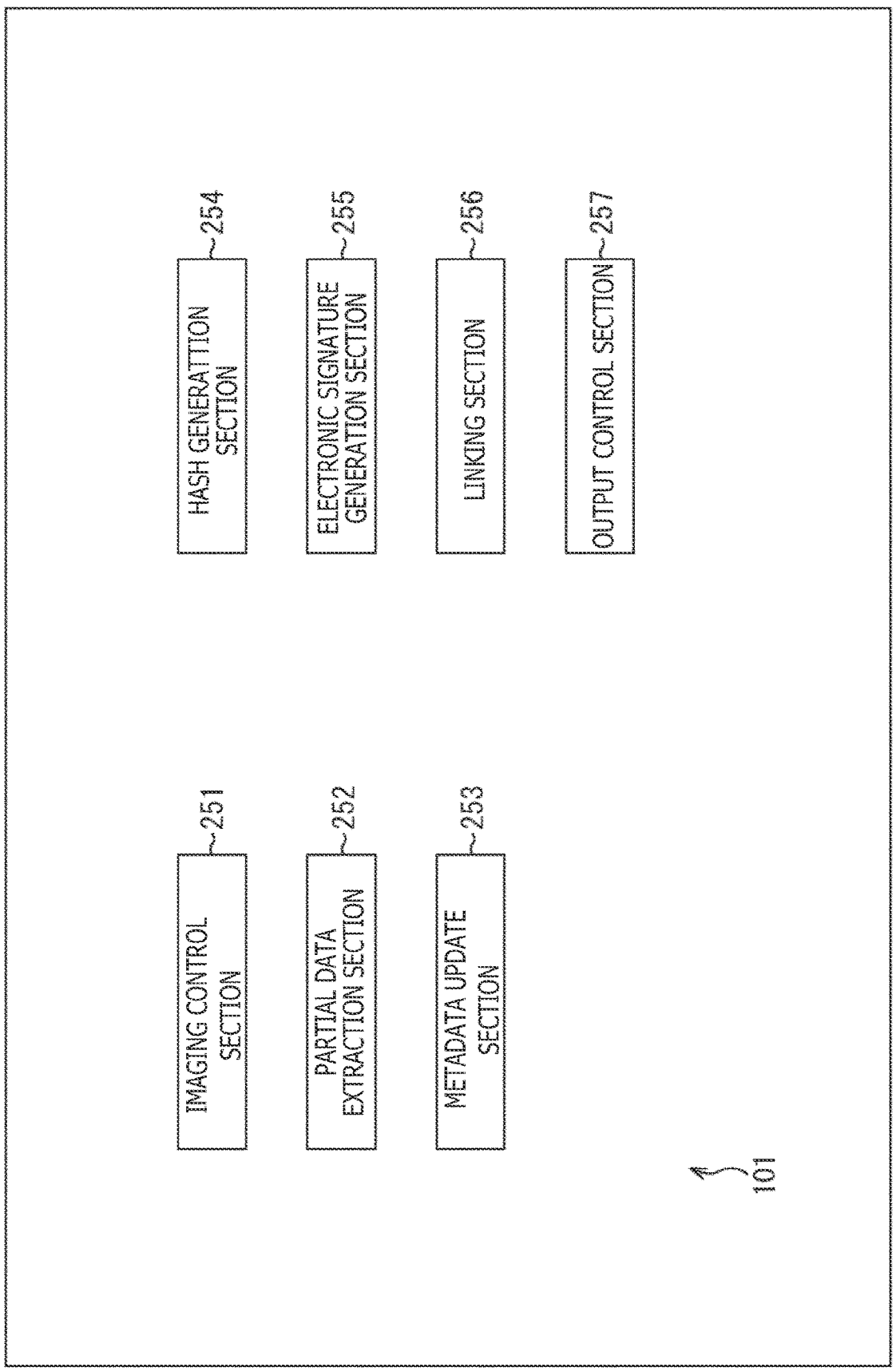
FIG. 4 is a functional block diagram depicting functions implemented in the imaging apparatus.

FIG. 4 depicts, as functional blocks, functions implemented by execution of application programs in the imaging apparatus 101. As depicted in FIG. 4, by executing the application programs, the imaging apparatus 101 can be provided with an imaging control section 251, a partial data extraction section 252, a metadata update section 253, a hash generation section 254, an electronic signature generation section 255, a linking section 256, and an output control section 257.

The imaging control section 251 controls and causes the imaging section 231 to execute processing related to imaging. The partial data extraction section 252 executes processing related to extraction of partial data of the captured image (data of a partial image of the captured image). The metadata update section 253 executes processing related to information update of metadata associated with the captured image. The hash generation section 254 executes processing related to generation of a hash. The electronic signature generation section 255 executes processing related to generation of an electronic signature. The linking section 256 executes processing related to linking of the captured image with other data. The output control section 257 executes processing related to control of data output.

<Flow of Imaging Processing>

An example of a flow of imaging processing executed by the imaging apparatus 101 will be described with reference to a flowchart in FIG. 5.

When the imaging processing is started, the imaging control section 251 controls and causes, in step S101, the imaging section 231 to image the subject and generate a captured image. Further, the imaging control section 251 controls and causes the sensor 232 to measure the distance to the subject and generate focus information (depth data). Then, the imaging control section 251 acquires the captured image and focus information generated.

In step S102, in reference to the focus information acquired in step S101, the partial data extraction section 252 extracts a focused part of the captured image also acquired. In step S103, the metadata update section 253 includes, in the metadata, extracted region information indicating the region extracted in step 102 (that is, partial identification for identifying a part of the captured image). In other words, as depicted in B of FIG. 2, the "extracted region information" is applied to the metadata 112. Then, the metadata thus updated is applied to the partial image (focused part) of the captured image. In other words, the metadata is linked (associated) with the partial image.

In step S104, the hash generation section 254 generates a hash for data of a combination of the partial image extracted in step S102 and the metadata updated in step S103. In other words, a hash for the partial image and the metadata linked with each other is generated.

In step S105, the electronic signature generation section 255 uses a private key to encrypt the hash generated in step S104 (hash for the partial image and the metadata linked with each other), to generate an electronic signature.

In step S106, the linking section 256 links (associates), with one another, the captured image acquired in step S101, the metadata updated in step S103, the electronic signature and certificate generated in step S105, and the public key corresponding to the private key used in step S105.

In step S107, the output control section 257 outputs the captured image, the metadata, the electronic signature, the certificate, and the public key linked (associated) with one another by the processing in step S106.

When the processing in step S107 ends, the imaging processing ends. The imaging processing executed as described above allows the electronic signature to be generated with use of a part of the captured image. In other words, the captured image can be linked with the hash value for a part of the captured image and the part identification information for identifying the part. Consequently, an increase in the load can be suppressed.

In the above description, a part of the captured image is identified in reference to the focus information, and the hash for the part is generated. However, the method for identifying the part is optional, and is not limited to the example of the focus information. For example, a partial image at a predetermined position in the captured image may be the "part" described above. Alternatively, an image obtained by decimation of some pixels from the captured image may be the "part" described above.

<Verification Apparatus and the Like>

Figure 6:
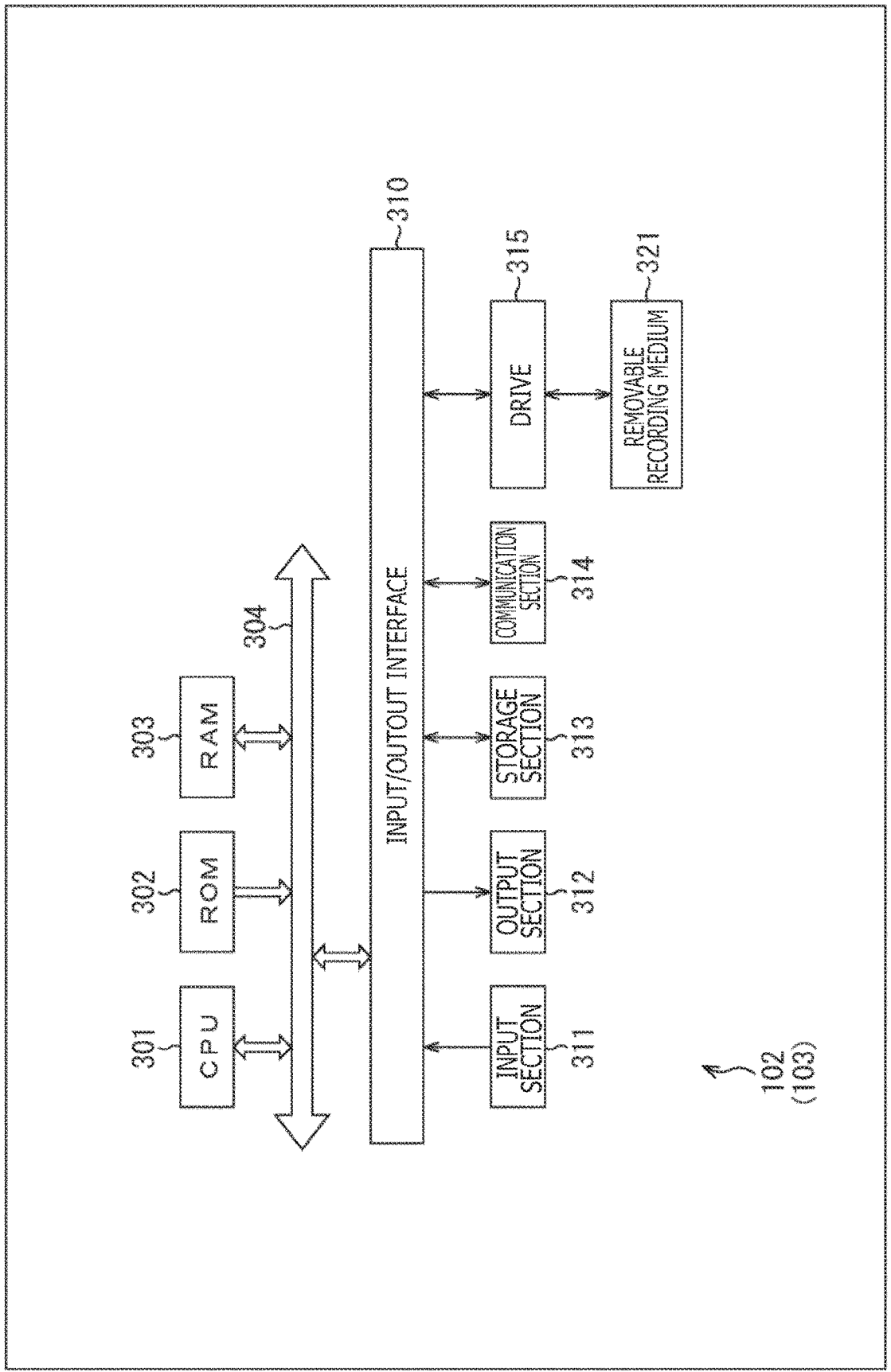

FIG. 6 is a diagram depicting a main configuration example of the verification apparatus 102 corresponding to an embodiment of the information processing apparatus to which the present technology is applied. The verification apparatus depicted in FIG. 6 is a computer in which an application program (software) for executing processing related to verification of the electronic signature is installed and executed. Here, examples of the computer include a computer integrated into dedicated hardware, for example, a general-purpose personal computer in which various programs are installed and which can execute various functions, and the like. The verification apparatus 102 executes the application programs to perform processing related to verification of the electronic signature.

In the verification apparatus 102 depicted in FIG. 6, a CPU 301, a ROM 302, and a RAM 203 are connected to one another via a bus 304.

An input/output interface 310 is also connected to the bus 304. The input/output interface 310 connects to an input section 311, an output section 312, a storage section 313, a communication section 314, and a drive 315.

The input section 311 includes, for example, a keyboard, a mouse, a microphone, a touch panel, an input terminal, and the like. The output section 312 includes, for example, a display, a speaker, an output terminal, and the like. The storage section 313 includes, for example, a hard disk, a RAM disk, a nonvolatile memory, and the like. The communication section 314 includes, for example, a network interface. The drive 315 drives a removable recording medium 321 such as a magnetic disk, an optical disk, a magneto-optical disk, or a semiconductor memory.

In the verification apparatus 102 configured as described above, the CPU 301 loads into the RAM 303 and executes, for example, an application program stored in the storage section 313, via the input/output interface 310 and the bus 304, thus performing a series of processing operations described above. The RAM 303 also appropriately stores data required for the CPU 301 to execute various processing operations, and the like.

The application program executed by the verification apparatus 102 can be recorded in the removable recording medium 321, used as a package medium or the like, for example, for application. In that case, the application program can be installed in the storage section 313 via the input/output interface 310 by mounting the removable recording medium 321 in the drive 315.

In addition, the application program can be provided via a wired or wireless transmission medium such as a local area network, the Internet, or digital broadcasting. In that case, the application program can be received by the communication section 314 and installed in the storage section 313.

Alternatively, the application program can be installed in the ROM 302 or the storage section 313 in advance.

Note that the certification authority 103 is configured similarly to the verification apparatus 102 depicted in FIG. 3. In other words, the block diagram depicted in FIG. 3 may also be used for description of the certification authority 103.

Figure 7:
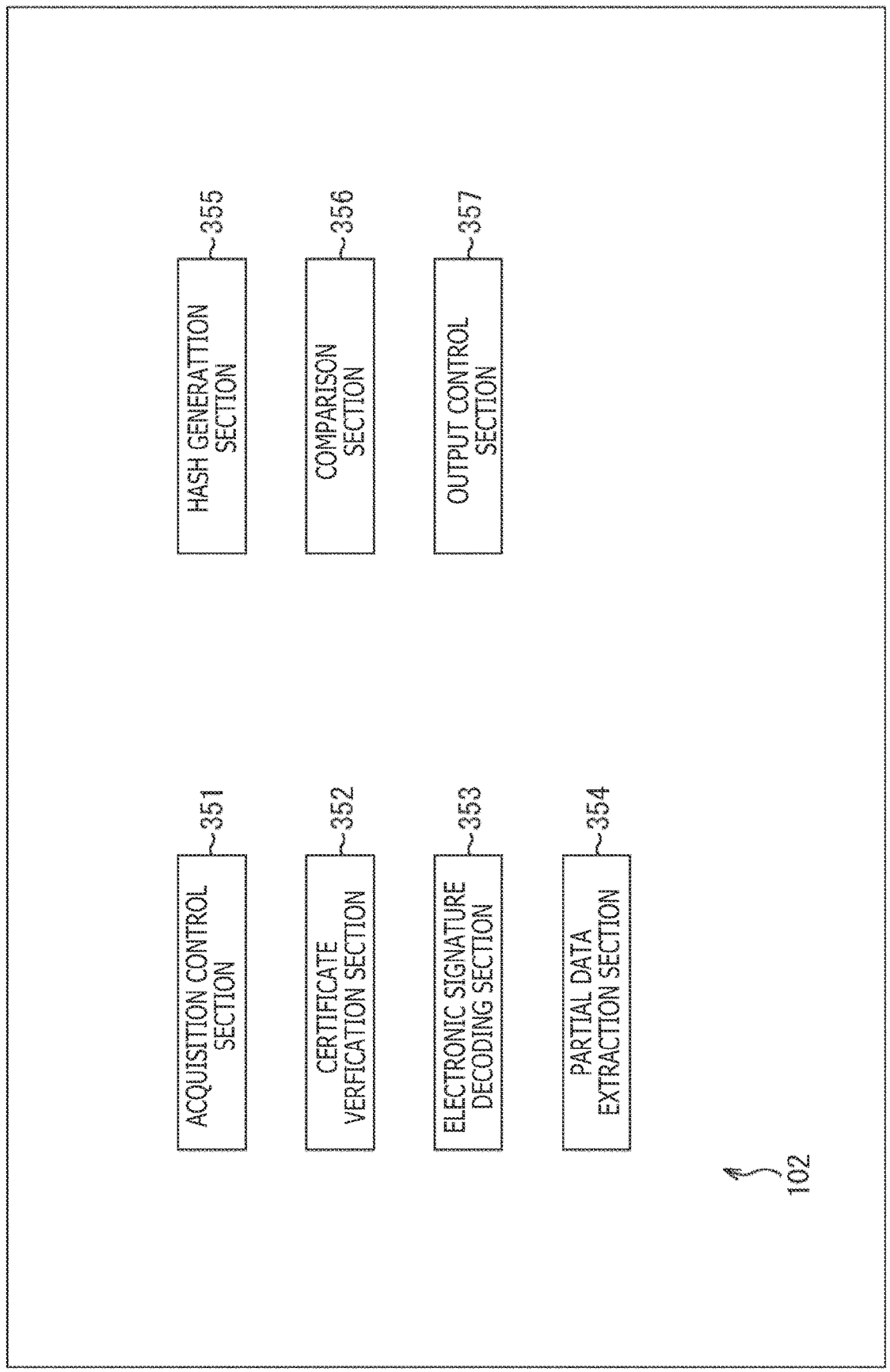
FIG. 7 is a functional block diagram depicting functions implemented in the verification apparatus.

FIG. 7 depicts, as functional blocks, functions implemented by execution of application programs in the verification apparatus 102. As depicted in FIG. 7, by executing the application programs, the verification apparatus 102 can be provided with an acquisition control section 351, a certificate verification section 352, an electronic signature decoding section 353, a partial data extraction section 354, a hash generation section 355, a comparison section 356, and an output control section 357.

The acquisition control section 351 executes processing related to acquisition of data such as the captured image and the electronic signature by, for example, control of the communication section 314 and the like. The certificate verification section 352 executes processing related to verification of the certificate. The electronic signature decoding section 353 executes processing related to decoding of the electronic signature. The partial data extraction section 354 executes processing related to extraction of partial data. The hash generation section 355 executes processing related to generation of a hash. The comparison section 356 executes processing related to comparison of the electronic signature. The output control section 357 executes processing related to data output.

<Flow of Verification Processing>

Now, an example of a flow of verification processing executed by the verification apparatus 102 and the certification authority 103 will be described with reference to a flowchart in FIG. 8.

When the verification processing is started, in step S201, by control of the communication section 314 and the like, the acquisition control section 351 of the verification apparatus 102 acquires the captured image, the metadata, the electronic signature, the certificate, and the public key fed from the imaging apparatus 101 and linked with one another. In other words, the electronic signature generated using a part of the captured image (the electronic signature including a hash value for a part (partial image) of the captured image corresponding to the extracted region information of the metadata and the part identification information for identifying the partial image (that is, the metadata)) is acquired.

In step S202, the certificate verification section 352 requests a certificate expire list from the certification authority 103 via the communication section 314. In step S221, the certification authority 103 receives the request from the verification apparatus 102. Then, in response to the request, the certification authority 103 feeds the certificate expire list to the verification apparatus 102. In step S203, the acquisition control section 351 of the verification apparatus 102 acquires the certificate expire list via the communication section 314.

In step S204, the certificate verification section 352 uses the certificate expire list acquired in step S203, to check the validity of the certificate.

In step S205, the electronic signature decoding section 353 uses the public key to decode the electronic signature acquired in step S201. In other words, a hash value for the partial image of the captured image corresponding to the extracted region information of the metadata and the metadata (part identification information) is obtained. In step S206, the partial data extraction section 354 extracts the partial image from the captured image in reference to the extracted region information of the metadata.

In step S207, the hash generation section 355 generates a hash for the partial image extracted and the metadata.

In step S208, the comparison section 356 compares the hash obtained by the processing in step S205 with the hash generated by the processing in step S207, and according to a comparison result, determines whether or not falsification has been performed.

In step S209, the output control section 357 outputs a verification result obtained in step S208. When the processing in step S209 ends, the verification processing ends.

The verification processing executed as described above allows the verification apparatus 102 to perform verification of the electronic signature using the hash for the partial image of the captured image. Consequently, an increase in the load can be suppressed.

3. Second Embodiment

<Identification of Partial Region Based on Image Analysis Result>

Note that image analysis may be performed on the captured image and that, according to a result of the analysis, the "part" of the captured image for which a hash is to be generated may be identified. For example, by performing the image analysis, the region of a person (or a face) in the captured image may be identified, the region may be designated as the "part" described above, and a hash may be generated for the region.

<Functional Blocks>

Figure 9:
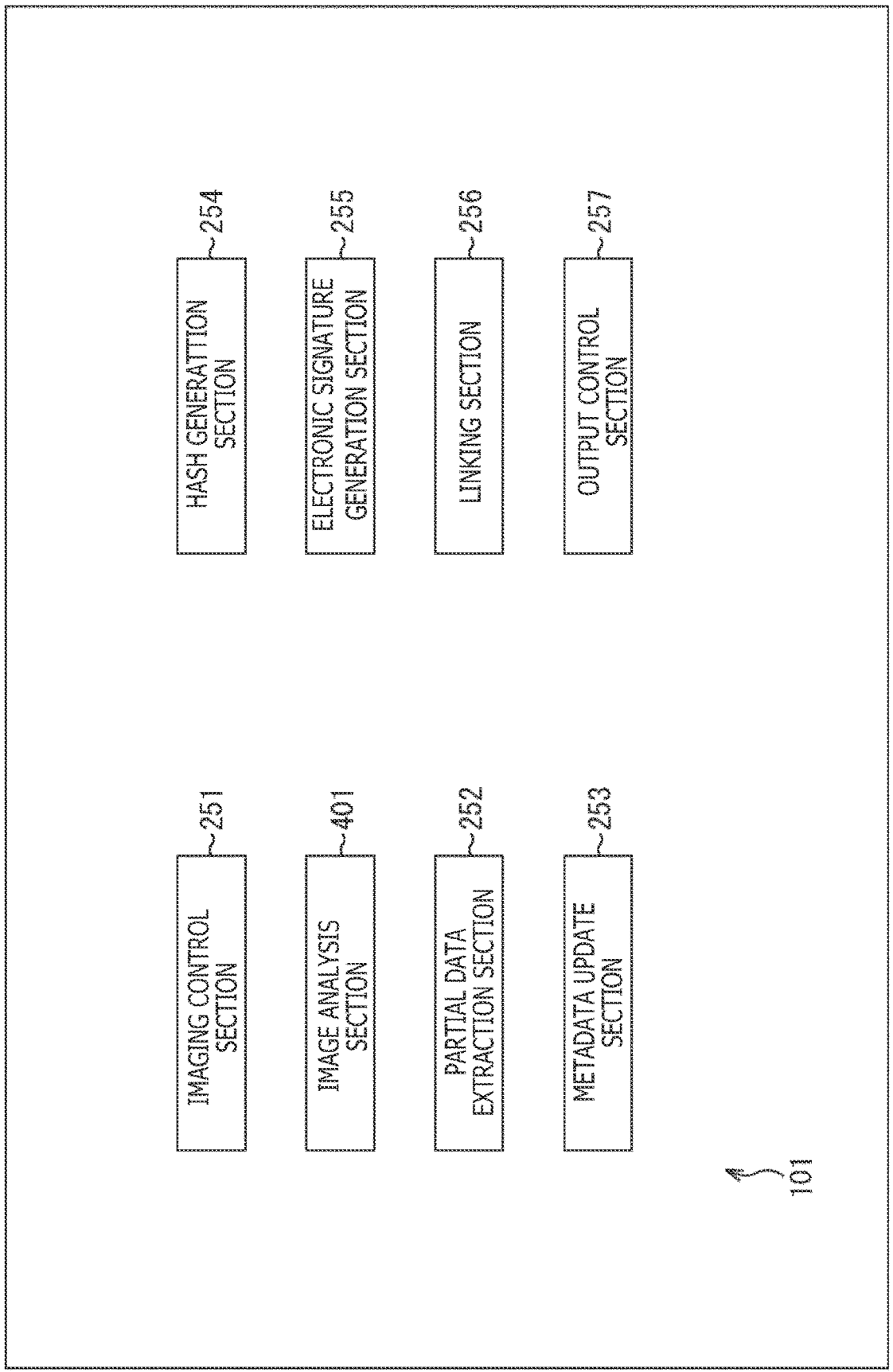
FIG. 9 is a functional block diagram depicting functions implemented in the imaging apparatus.

FIG. 9 depicts, as functional blocks, functions implemented by execution of the application programs in the imaging apparatus 101 in the above-described case. As depicted in FIG. 9, in this case, the imaging apparatus 101 includes an image analysis section 401 in addition to the functional blocks in the case of FIG. 4. The image analysis section 401 executes processing related to image analysis for the captured image and the like.

<Flow of Imaging Processing>

Figure 10:
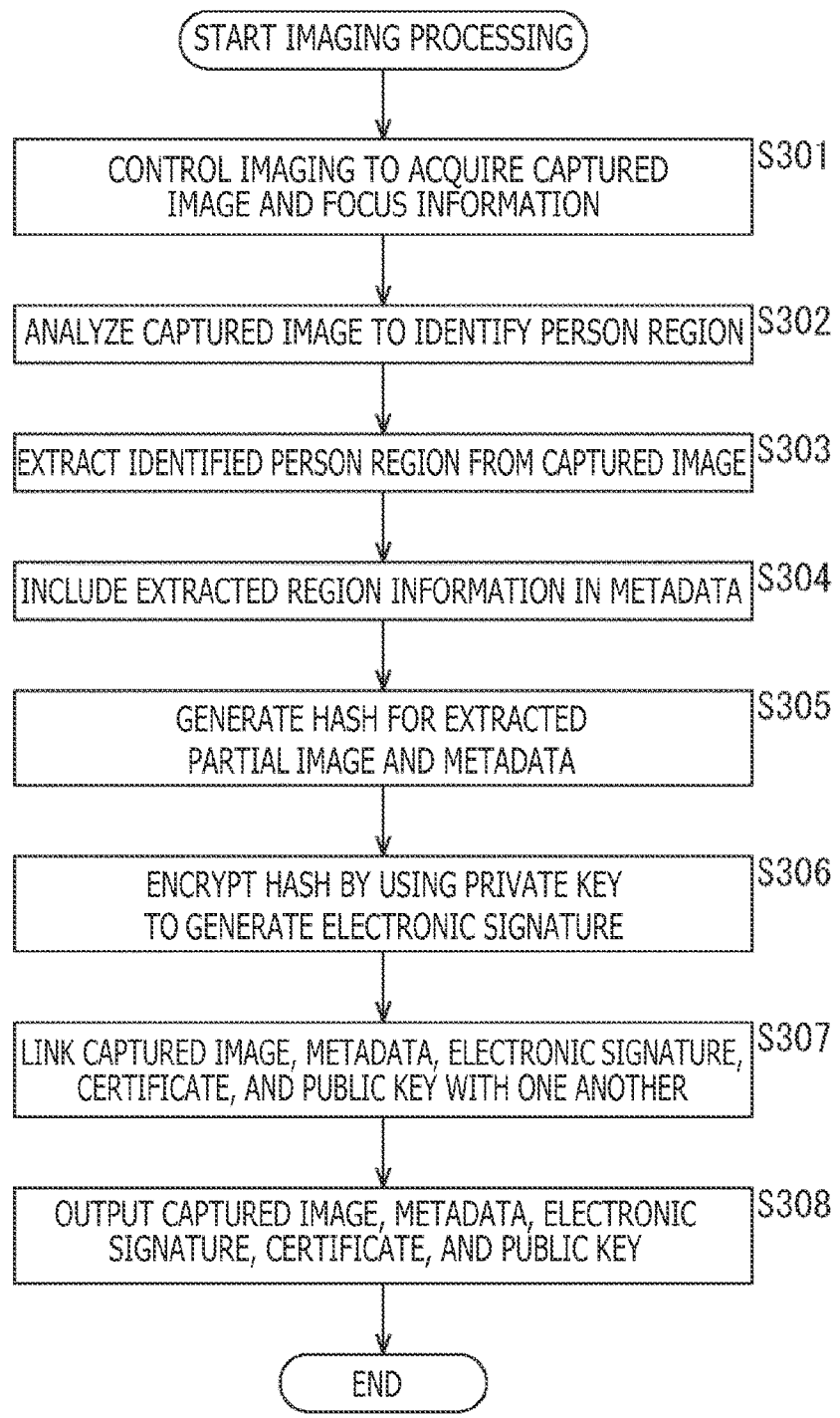
FIG. 10 is a flowchart illustrating an example of flow of imaging processing.

An example of a flow of imaging processing in this case will be described with reference to a flowchart in FIG. 10. When the imaging processing is started, the imaging control section 251 controls and causes, in step S301, the imaging section 231 to image the subject and generate a captured image of the subject. Further, the imaging control section 251 controls and causes the sensor 232 to measure the distance to the subject and generate focus information (depth data). Then, the imaging control section 251 acquires the captured image and focus information generated.

In step S302, the image analysis section 401 performs image analysis on the captured image to identify a region with a person (person region). In step S303, the partial data extraction section 252 extracts the identified person region of the captured image.

Figure 5:
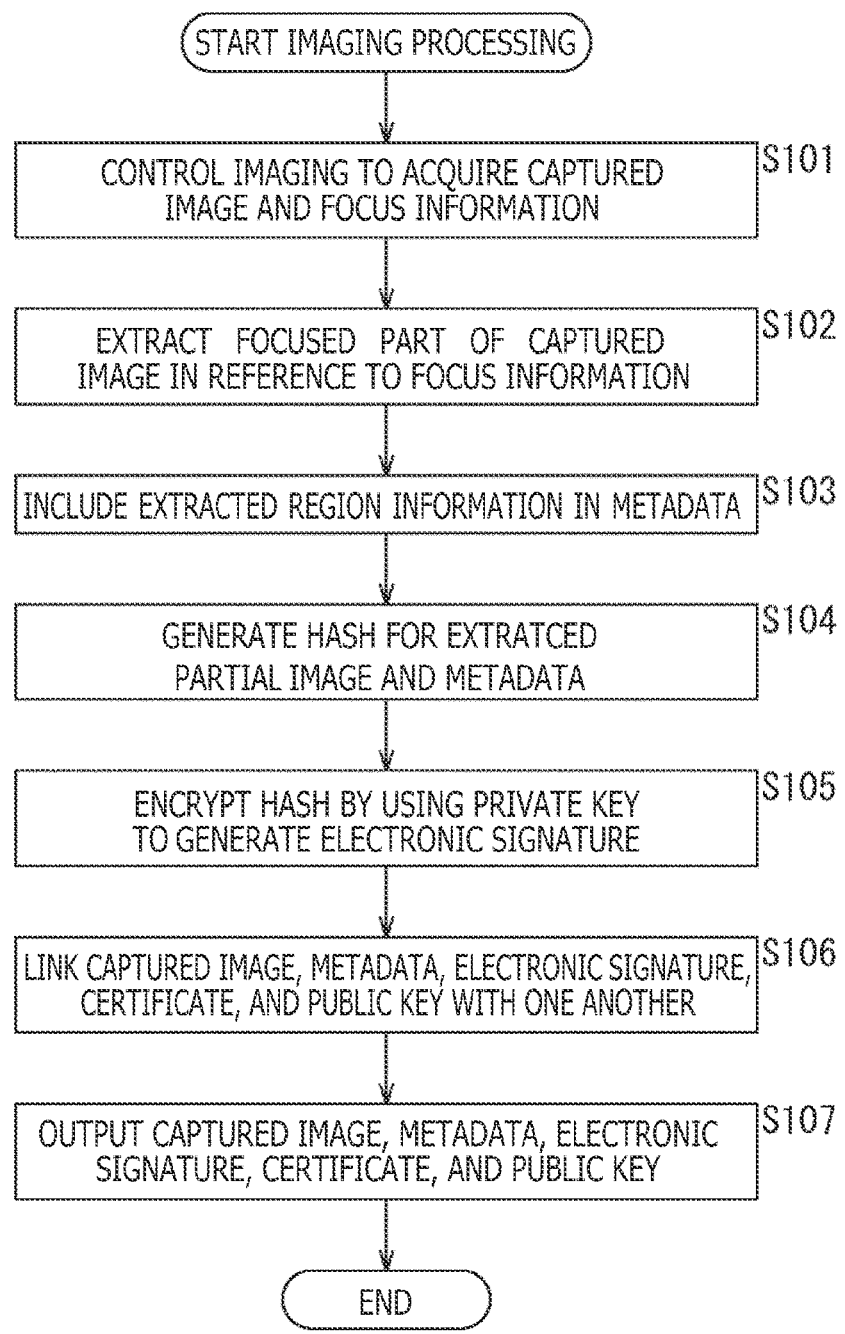
FIG. 5 is a flowchart illustrating an example of a flow of imaging processing.

Processing operations in steps S304 to S308 are executed in a manner similar to that of the processing operations in steps S103 to S107 in FIG. 5.

The imaging processing executed as described above allows the imaging apparatus 101 to generate an electronic signature with use of a part of the captured image corresponding to an image analysis result. In other words, a hash for a more important part of the captured image can be generated and associated with the captured image. Consequently, an increase in the load can be suppressed.

Note that, in the above description, image analysis is used to identify a person region. However, any region other than a person region may be identified by image analysis.

Moreover, verification processing in this case is similar to the verification processing in the case of the first embodiment, and the description of the verification processing is thus omitted.

4. Third Embodiment

<Moving Image>

Note that the captured image with which the electronic signature is to be associated may be a moving image. In this case, only for some frames, the hash for the partial image may be linked with the captured image as described above. For example, only for I frames, the hash for the partial image may be linked with the captured image.

<Functional Blocks>

Figure 11:
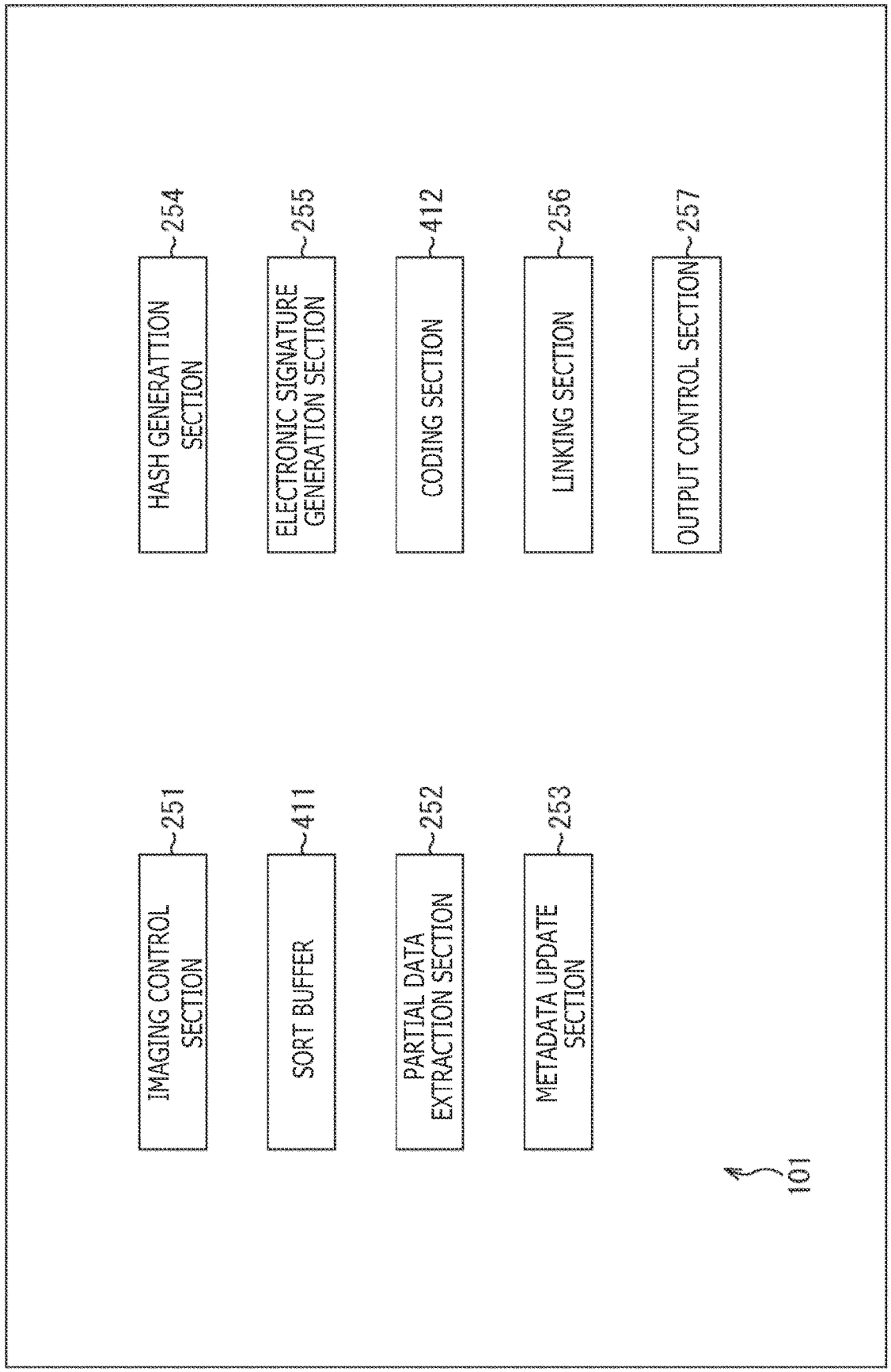
FIG. 11 is a functional block diagram depicting functions implemented in the imaging apparatus.

FIG. 11 depicts, as an example of functional blocks, functions implemented by execution of the application programs in the imaging apparatus 101 in the above-described case. As depicted in FIG. 11, in this case, the imaging apparatus 101 includes a sort buffer 411 and a coding section 412 in addition to the functional blocks in the case of FIG. 4. The sort buffer 411 holds multiple frames of a moving image to be coded and changes the order of arrangement of the frames from a reproduction order to a decoding order. The coding section 412 executes processing related to coding of the captured image (moving image) with use of, for example, a coding scheme for two-dimensional moving images such as AVC (Advanced Video Coding) or HEVC (High Efficiency Video Coding).

<Flow of Imaging Processing>

Figure 12:
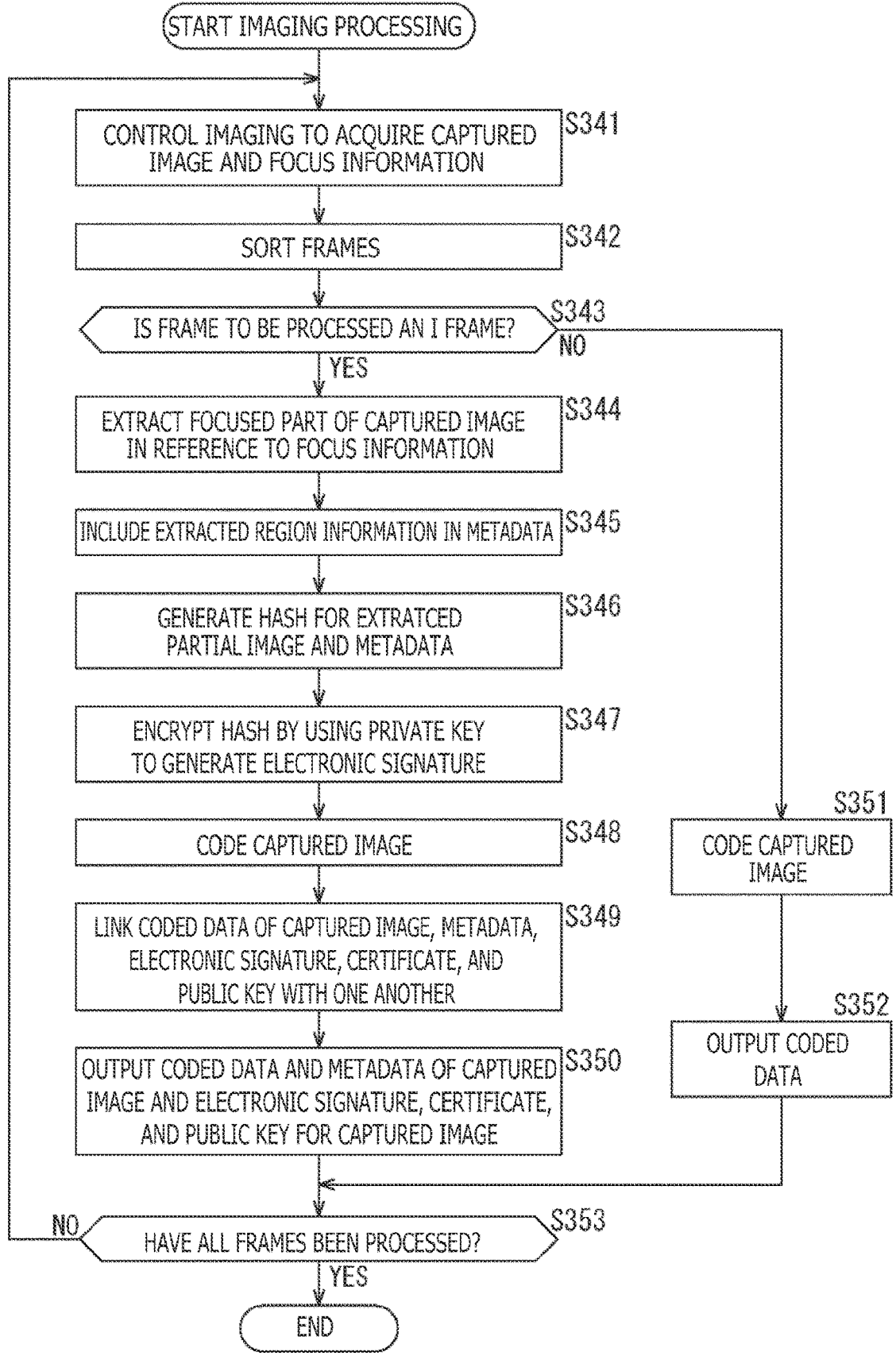
FIG. 12 is a flowchart illustrating an example of a flow of the imaging processing.

An example of a flow of imaging processing in this case will be described with reference to a flowchart in FIG. 12. Note that here, as an example, described will be a case in which focus information is used to set the partial image for which a hash is to be generated.

When the imaging processing is started, the imaging control section 251 controls and causes, in step S341, the imaging section 231 to image the subject and generate a captured image of the subject. Further, the imaging control section 251 controls and causes the sensor 232 to measure the distance to the subject and generate focus information (depth data). Then, the imaging control section 251 acquires the captured image and focus information generated.

In step S342, the sort buffer 411 holds multiple frame images and changes the order of arrangement of the frames from the reproduction order to the coding order.

In step S343, the partial data extraction section 252 determines whether or not the frame to be processed is an I frame. In a case where the partial data extraction section 252 determines that the frame to be processed is an I frame, the processing proceeds to step S344.

The processing operations in steps S344 to S347 are performed in a manner similar to that of the processing operations in steps S102 to S105. In step S348, the coding section 412 codes the captured image to be processed, to generate coded data.

In step S349, the linking section 256 links, with one another, the coded data of the captured image, the metadata, the electronic signature, the certificate, and the public key. In step S350, the output control section 257 outputs the data.

When the processing in step 3350 ends, the processing proceeds to step S353. Alternatively, in step S343, in a case where the partial data extraction section 252 determines that the frame to be processed is not an I frame, the processing proceeds to step S351.

In step S351, the coding section 412 codes the captured image to generate coded data. In step S352, the output control section 257 outputs the coded data. When the processing in step S352 ends, the processing proceeds to step S353.

In step S353, the imaging control section 251 determines whether or not all the frames have been processed. In a case where the imaging control section 251 determines that there is a frame yet to be processed, the processing returns to step S341, and the subsequent processing is executed. Alternatively, in a case where the imaging control section 251 determines in step S353 that all the frames have been processed, the imaging processing ends.

The imaging processing executed as described above allows a hash for a part of the captured image to be generated only for I frames of the moving image and used for generation of an electronic signature. Consequently, an increase in the load can be suppressed.

<Functional Blocks of Verification Apparatus>

Figure 13:
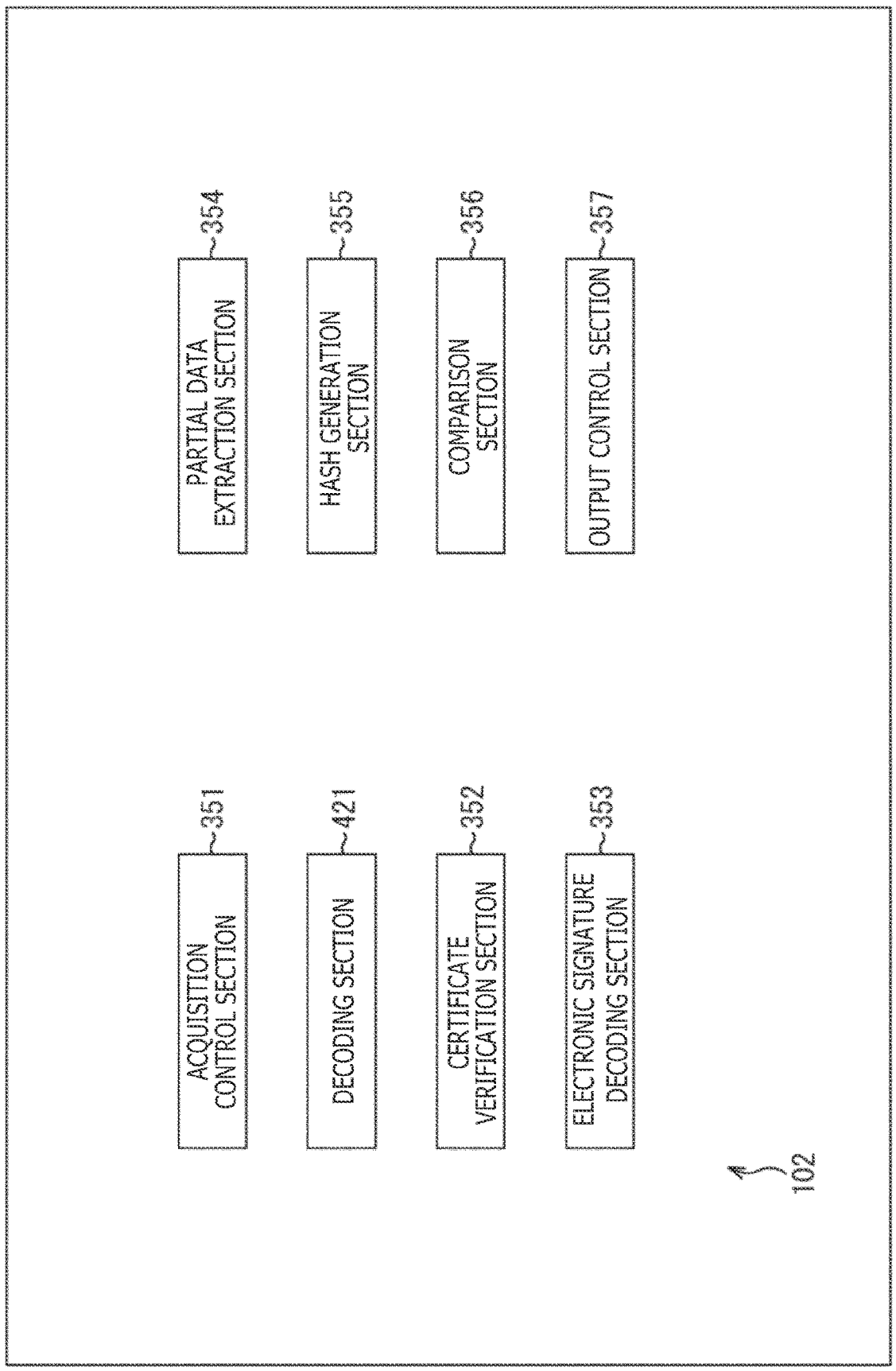
FIG. 13 is a functional block diagram depicting functions implemented in the verification apparatus.

Further, FIG. 13 depicts, as an example of functional blocks, functions implemented by execution of the application programs in the verification apparatus 102 in the above-described case. As depicted in FIG. 13, in this case, the verification apparatus 102 includes a decoding section 421 in addition to the functional blocks in the case of FIG. 7. The decoding section 421 executes processing related to decoding of coded data of the moving image. The sort buffer 411 holds multiple frames of the moving image to be coded and changes the order of arrangement of the frames from the reproduction order to the decoding order. The coding section 412 executes processing related to coding of the captured image (moving image) with use of, for example, a coding scheme for two-dimensional moving images such as AVC (Advanced Video Coding) or HEVC (High Efficiency Video Coding).

<Flow of Verification Processing>

Figure 14:
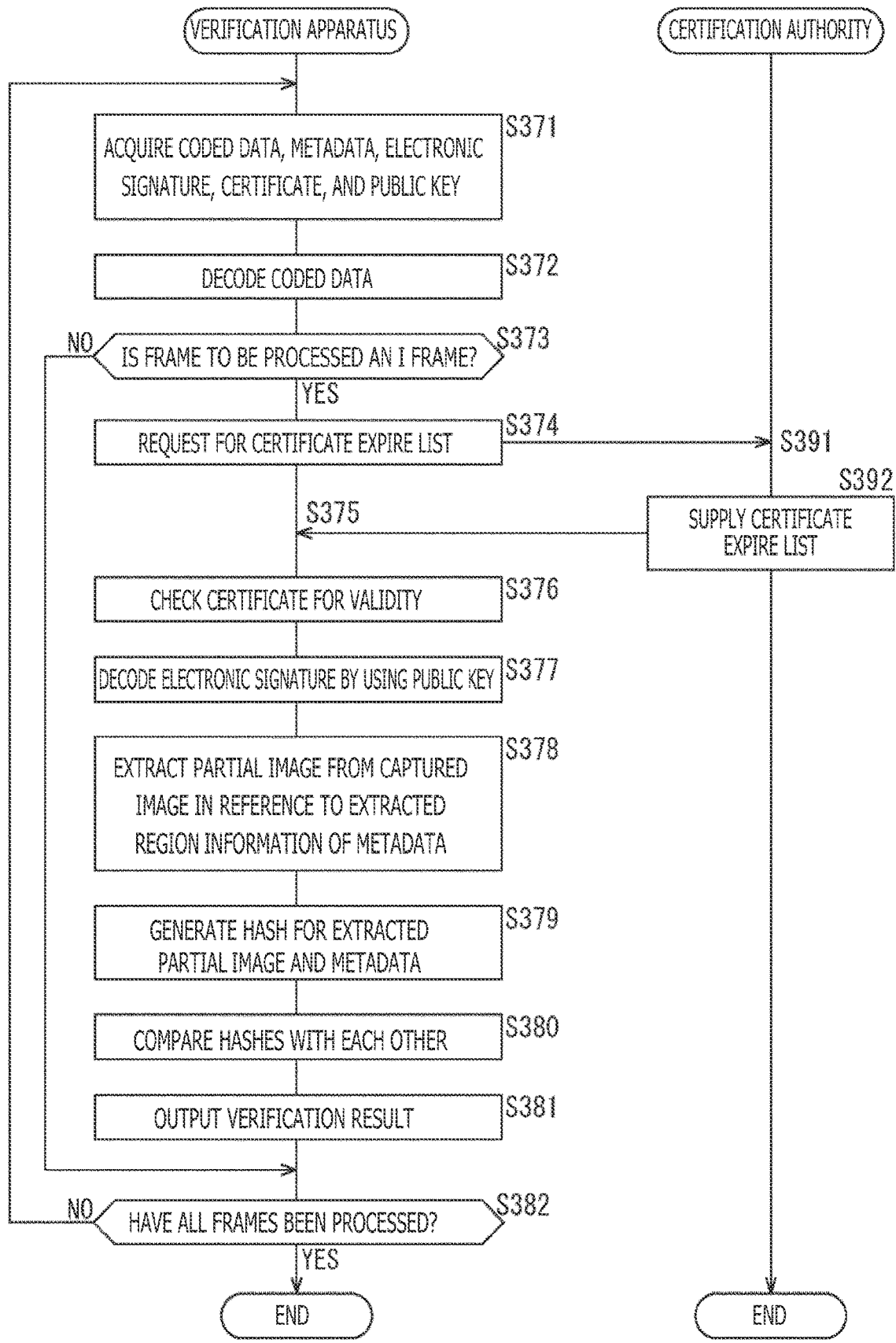
FIG. 14 is a flowchart illustrating an example of a flow of processing related to verification.

Now, an example of verification processing executed by the verification apparatus 102 and the certification authority 103 in the above-described case will be described with reference to a flowchart in FIG. 14.

When the verification processing is started, in step S371, by control of the communication section 314 and the like, the acquisition control section 351 of the verification apparatus 102 acquires the coded data and the metadata of the captured image and the electronic signature, the certificate, and the public key for the captured image that are linked with one another.

In step S372, the decoding section 421 decodes the coded data to generate a frame image.

In step S373, the decoding section 421 determines where or not the frame to be processed is an I frame. In a case where the frame to be processed is determined to be an I frame, the processing proceeds to step S374.

Figure 8:
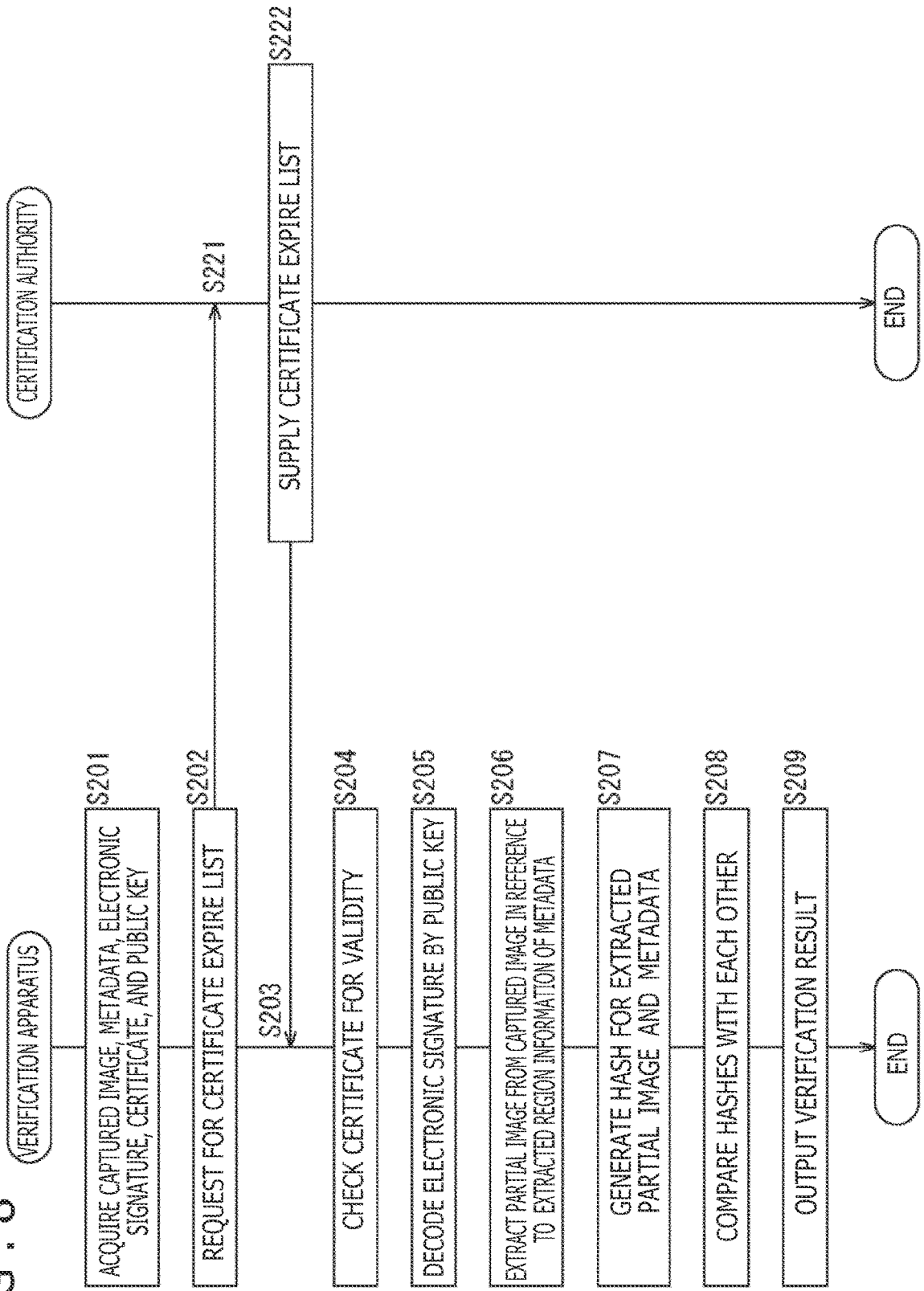
FIG. 8 is a flowchart illustrating an example of a flow of processing related to verification.

Processing operations in steps S374 to S381 are executed in a manner similar to that of the processing operations in steps S202 to S209 in FIG. 8. Further, processing operations in steps S391 and S392 are executed by the certification authority 103 in a manner similar to that of the processing operations in steps S221 and S222 in FIG. 8.

When the processing in step S381 ends, the processing proceeds to step S382. Alternatively, in step S373, in a case where the frame to be processed is determined not to be an I frame, the processing proceeds to step S382.

In step S382, the output control section 357 determines whether or not all the frames have been processed. In a case where the output control section 357 determines that there is a frame yet to be processed, the processing returns to step S371 to repeat the subsequent processing. Alternatively, in step S382, in a case where the output control section 357 determines that all the frames have been processed, the verification processing ends.

The verification processing executed as described above allows the verification apparatus 102 to perform the verification of the electronic signature using the hash for the partial image of the captured image only for the I frames of the moving image. Consequently, an increase in the load can be suppressed.

5. Fourth Embodiment

<Control Corresponding to Imaging Mode>

Note that the method of generating an electronic signature may be controlled according to the imaging mode. For example, in an imaging mode in which a moving image is captured or in an imaging mode for what is generally called continuous shooting, the electronic signature is generated using the hash for the partial image as described above. In an ordinary still image imaging mode, the electronic signature may be generated using the hash for the entire captured image.

<Functional Blocks>

Figure 15:
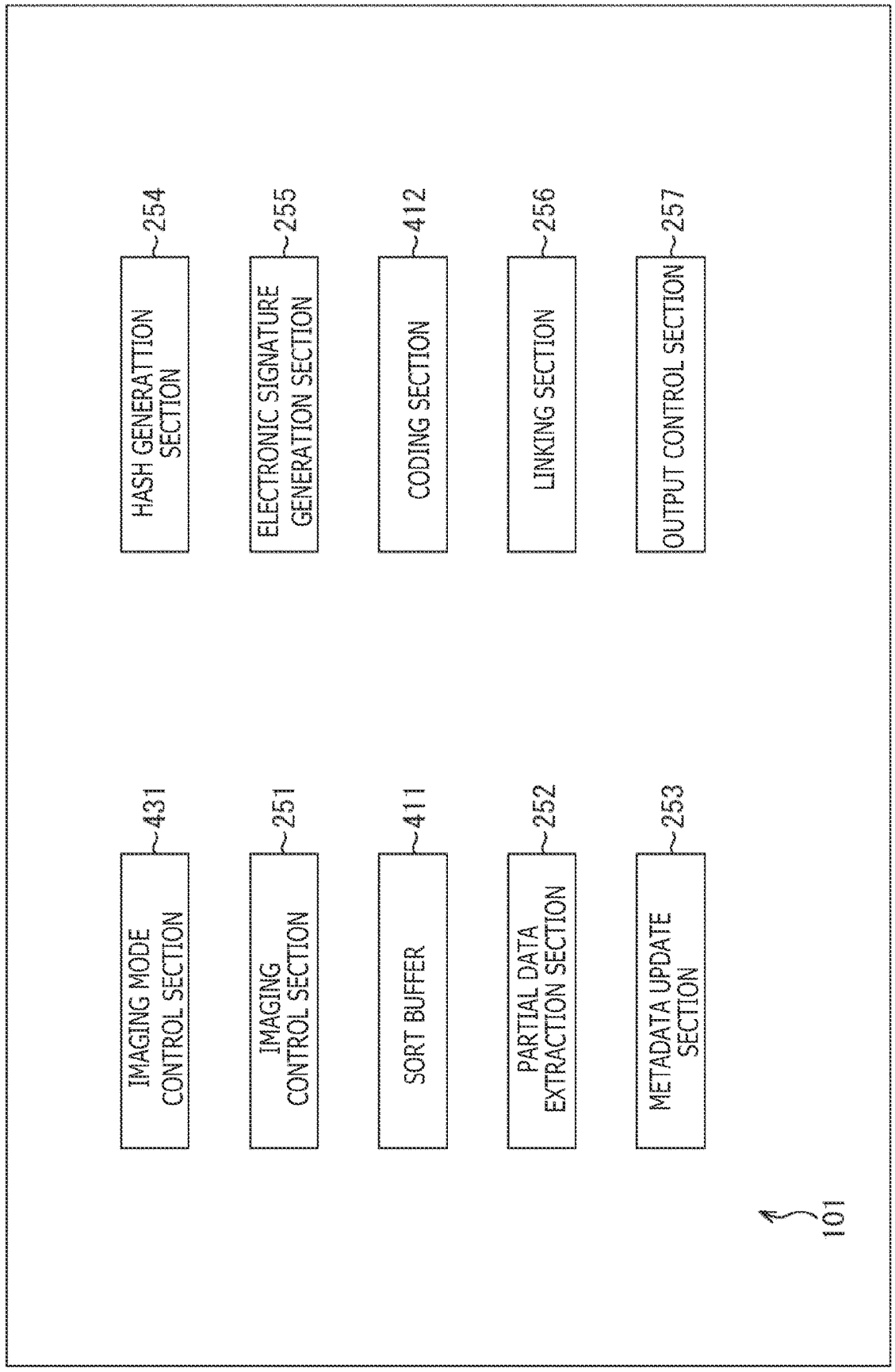
FIG. 15 is a functional block diagram depicting functions implemented in the imaging apparatus.

FIG. 15 depicts, as an example of functional blocks, functions implemented by execution of the application programs in the imaging apparatus 101 in the above-described case. As depicted in FIG. 15, in this case, the imaging apparatus 101 includes an imaging mode control section 431 in addition to the functional blocks in the case of FIG. 11. The imaging mode control section 431 performs control related to generation of an electronic signature according to the imaging mode.

<Flow of Imaging Processing>

Figure 16:
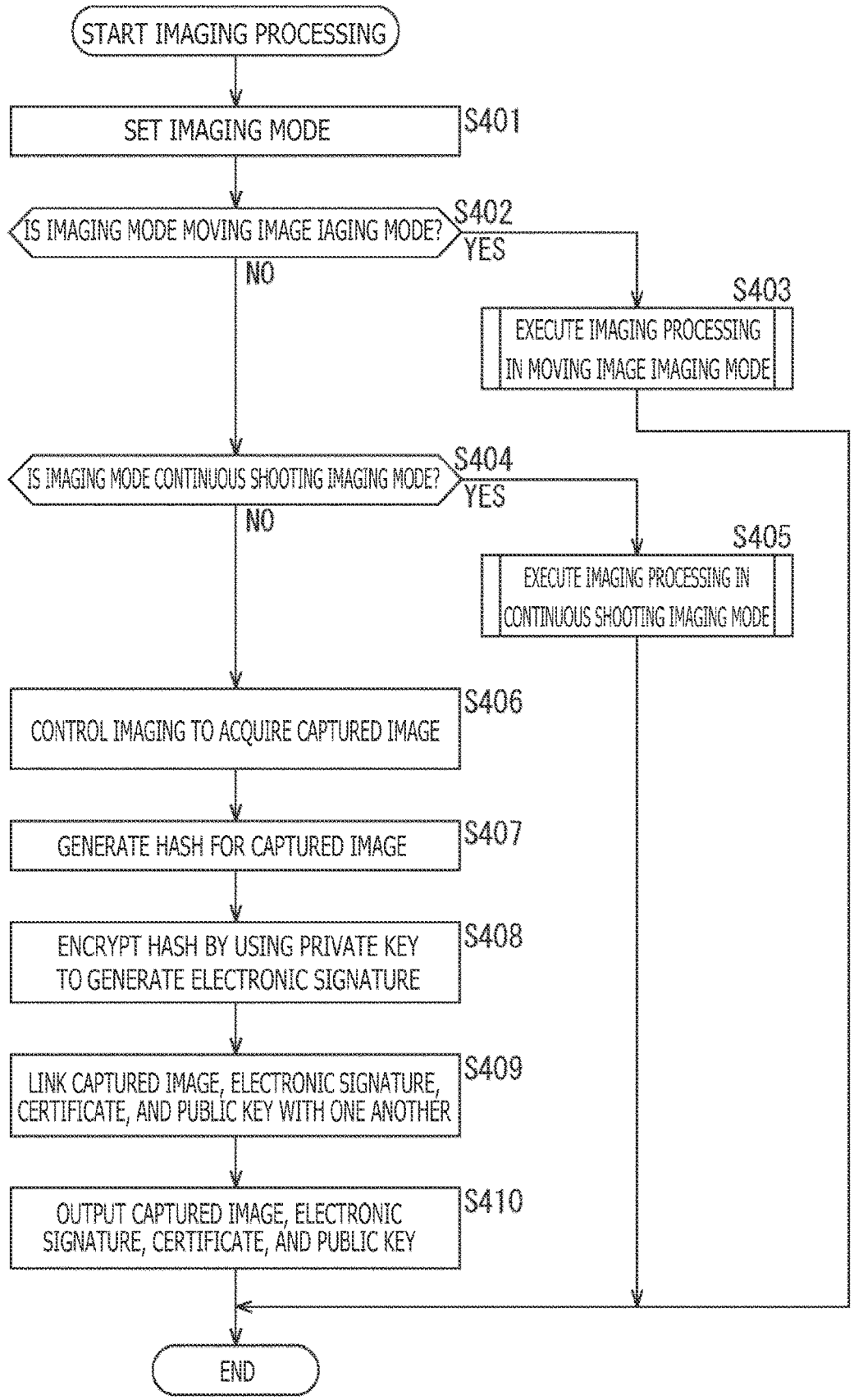
FIG. 16 is a flowchart illustrating an example of a flow of the imaging processing.

A flow of the imaging processing in this case will be described with reference to a flowchart in FIG. 16. When the imaging processing is started, the imaging mode control section 431 sets the imaging mode in step S401. In step S402, the imaging mode control section 431 determines whether or not the imaging mode is a moving image imaging mode in which a moving image is captured. In a case where the imaging mode is determined to be the moving image imaging mode, the processing proceeds to step S403.

In step S403, the imaging apparatus 101 performs the imaging processing in the moving image imaging mode. In other words, the imaging apparatus 101 executes imaging processing similar to that described with reference to the flowchart in FIG. 12. When the processing in step S403 ends, the imaging processing ends.

Further, in step S402, in a case where the imaging mode is determined not to be the moving image imaging mode, the processing proceeds to step S404. In step S404, the imaging mode control section 431 determines whether or not the imaging mode is a continuous shooting imaging mode in which a captured image of a still image is captured multiple times during a short period of time (what is generally called continuous shooting is performed). In a case where the imaging mode is determined to be the continuous shooting imaging mode, the processing proceeds to step S405.

In step S405, the imaging apparatus 101 executes the imaging processing in the continuous shooting imaging mode. In other words, the imaging apparatus 101 executes imaging processing similar to that described with reference to the flowchart in FIG. 5 or FIG. 10, and generates an electronic signature with use of the hash of the partial image. When the processing in step S405 ends, the imaging processing ends Alternatively, in step S404, in a case where the imaging mode is determined not to be the continuous shooting imaging mode, the processing proceeds to step S406. In this case, an electronic signature is generated with use of the hash for the entire captured image.

Consequently, in step S406, the imaging control section 251 controls and causes the imaging section 231 to image the subject and generate a captured image of the subject. Then, the imaging control section 251 acquires the captured image generated.

In step S407, the hash generation section 254 generates a hash for the entire captured image. In step S408, the electronic signature generation section 255 uses the private key to encrypt the hash generated in step S407 and generates an electronic signature.

In step S409, the linking section 256 links, with one another, the captured image acquired, the electronic signature generated in step S408, the certificate, and the public key.

In step S410, the output control section 257 outputs the captured image, the electronic signature, the certificate, and the public key that have been associated with one another by the processing in step S409. When the processing in step S410 ends, the imaging processing ends.

The imaging processing executed as described above allows the appropriate imaging processing to be executed according to the imaging mode. Consequently, an increase in the load can be suppressed more appropriately.

6. Supplementary Note

<Hardware>
The series of processing operations can be executed by software (application programs) or by hardware.
<Application Target of Present Technology>
The present technology can be applied to any configuration. For example, the present technology can be implemented as a partial configuration of an apparatus such as a processor used as system LSI (Large Scale Integration) or the like, a module using multiple processors or the like, a unit using multiple modules or the like, or a set including the unit to which other functions are added.

Further, for example, the present technology can also be applied to a network system including multiple apparatuses. For example, the present technology may be implemented as cloud computing in which multiple apparatuses share and cooperate in processing via a network. For example, the present technology may be implemented in a cloud service in which services are provided to any terminals such as computers, portable information terminals, and IoT (Internet of Things) devices.

Note that, in the present specification, the system means a set of multiple components (apparatuses, modules (parts), or the like) regardless of whether all the components are located in the same housing. Consequently, multiple apparatuses placed in separate housings and connected to each other via a network constitute a system, and one apparatus including multiple modules placed in one housing also constitutes a system.

<Fields and Uses to which Present Technology is Applicable>

A system, an apparatus, processing, or the like to which the present technology is applied can be used in any fields such as transportation, medical care, crime prevention, agriculture, livestock industry, mining, beauty care, factories, home electrical appliances, meteorology, and nature monitoring. Further, the system, apparatus, processing, or the like may have any use.

Other Embodiments

The embodiments of the present technology are not limited to the embodiments described above, and various changes may be made to the embodiments without departing from the spirit of the present technology.

For example, the configuration described as one apparatus (or processing section) may be divided into multiple apparatuses (or processing sections). In contrast, the configurations described as multiple apparatuses (or processing sections) may be combined into one apparatus (or processing section). Further, needless to say, to the configuration of each apparatus (or each processing section), components other than those described above may be added. Moreover, a part of the configuration of a certain apparatus (or processing section) may be included in the configuration of another apparatus (or another processing section) as long as the configuration or operation of the system as a whole remains substantially unchanged.

Further, for example, the programs described above may be executed in any apparatus. In that case, the apparatus is only required to include required functions (functional blocks or the like) and be configured to obtain required information.

Further, for example, the steps in one flowchart may be executed by one apparatus or may be shared by multiple apparatuses. Moreover, in a case where one step includes multiple processing operations, the multiple processing operations may be executed by one apparatus or may be shared by multiple apparatuses. In other words, multiple processing operations included in one step can be executed as processing in multiple steps. In contrast, the processing described as multiple steps can be collectively executed as one step.

Further, for example, for the program executed by the computer, processing in steps describing the program may be chronologically executed in the order described herein or may be executed in parallel or separately at required timings such as the time when the program is invoked. In other words, the processing in the steps may be executed in an order different from the one described above unless this leads to contradiction. Further, the processing in the steps describing the program may be executed in parallel with or in combination with processing of another program.

Further, for example, multiple technologies related to the present technology can be independently and solely implemented unless this leads to contradiction. Needless to say, any multiple present technologies may be implemented together. For example, a part or all of the present technology described in one of the embodiments can be combined for implementation with a part or all of the present technology described in another embodiment. Further, a part or all of any of present technologies described above can be implemented with another technology not described above.

Note that the present technology can also be configured as follows.

(1) An imaging apparatus including:
a linking section that links a captured image with a hash value for a part of the captured image and part identification information for identifying the part.

(2) The imaging apparatus according to (1), in which the part is a focused part of the captured image.

(3) The imaging apparatus according to (1), in which the part is a partial region at a predetermined position in the captured image.

(4) The imaging apparatus according to (1), in which the part is a part resulting from decimation of some pixels from the captured image.

(5) The imaging apparatus according to (1), in which the part is a part identified according to a result of image analysis of the captured image.

(6) The imaging apparatus according to any one of (1) to (5), further including:
an extraction section that extracts the part from the captured image.

(7) The imaging apparatus according to (6), in which the extraction section extracts the focused part of the captured image in reference to focus information.

(8) The imaging apparatus according to (6), in which the extraction section extracts the part from the captured image according to the result of image analysis of the captured image.

(9) The imaging apparatus according to any one of (1) to (8), further including:
a hash value generation section that generates the hash value by using the part of the captured image and the part identification information, in which
the linking section links the captured image with the hash value generated by the hash value generation section.

(10) The imaging apparatus according to any one of (1) to (9), further including:
an electronic signature generation section that generates an electronic signature including the hash value, in which
the linking section links the captured image with the electronic signature generated by the electronic signature generation section.

(11) The imaging apparatus according to (10), further including:
an update section that updates metadata of the captured image by using the part identification information, in which
the linking section applies, to the captured image, the metadata updated by the update section, to link the metadata with the captured image.

(12) The imaging apparatus according to any one of (1) to (11), in which
the linking section links the captured image with a public key used to generate the electronic signature and a certificate for the public key.

(13) The imaging apparatus according to any one of (1) to (12), in which
the captured image is a moving image, and
the linking section links, only for an I frame of the moving image, the captured image with the hash value for the part of the captured image and the part identification information.

(14) The imaging apparatus according to any one of (1) to (12), in which
the captured image is a moving image, and
the linking section links, only for a frame of the moving image including movement more intense than a threshold, the captured image with the hash value for the part of the captured image and the part identification information.

(15) The imaging apparatus according to any one of (1) to (12), in which,
in a continuous shooting mode, the linking section links the captured image with the hash value for the part of the captured image and the part identification information, and,
in a mode other than the continuous shooting mode, the linking section links the captured image with a hash value for the entire captured image.

(16) An information processing method including:
linking a captured image with a hash value for a part of the captured image and part identification information for identifying the part.

(17) A program causing a computer to function as:
a linking section that links a captured image with a hash value for a part of the captured image and part identification information for identifying the part.

(18) An information processing apparatus including:
an extraction section that extracts a part of a captured image from the captured image in reference to part identification information for identifying the part, the part identification information being linked with the captured image along with a hash value for the part and the part identification information;
a hash value generation section that generates a hash value for the part extracted by the extraction section and the part identification information; and
a comparison section that compares the hash value generated by the hash value generation section with the hash value linked with the captured image.

(19) An information processing method including:
extracting a part of a captured image from the captured image in reference to part identification information for identifying the part, the part identification information being linked with the captured image along with a hash value for the part and the part identification information;
generating a hash value for the part extracted and the part identification information; and
comparing the hash value generated with the hash value linked with the captured image.

(20) A program causing a computer to function as:
an extraction section that extracts a part of a captured image from the captured image in reference to part identification information for identifying the part, the part identification information being linked with the captured image along with a hash value for the part and the part identification information;
a hash value generation section that generates a hash value for the part extracted by the extraction section and the part identification information; and
a comparison section that compares the hash value generated by the hash value generation section with the hash value linked with the captured image.

REFERENCE SIGNS LIST

100: Falsification detection system
101: Imaging apparatus
102: Verification apparatus
103: Certification authority 231: Imaging section
232: Sensor
251: Imaging control section
252: Partial data extraction section
253: Metadata update section
254: Hash generation section
255: Electronic signature generation section
256: Linking section
257: Output control section
351: Acquisition control section
352: Certificate verification section
353: Electronic signature decoding section
354: Partial data extraction section
355: Hash generation section
356: Comparison section
357: Output control section
401: Image analysis section
411: Sort buffer
412: Coding section
421: Decoding section
431: Imaging mode control section

The invention claimed is:

1. An imaging apparatus comprising:
circuitry configured to
link a captured image with a hash value for a part of the captured image and part identification information for identifying the part, the captured image being a moving image,
select only frames of the moving image in which movement is higher than movement of a preceding frame of the moving image by a predetermined threshold,
link, for only the selected frames, the captured image with the hash value for the part of the captured image and the part identification information,
generate an electronic signature by using a private key to encrypt the hash value, and
link the captured image with the electronic signature.

2. The imaging apparatus according to claim 1, wherein the part is a focused part of the captured image.

3. The imaging apparatus according to claim 1, wherein the part is a partial region at a predetermined position in the captured image.

4. The imaging apparatus according to claim 1, wherein the part is a part resulting from decimation of some pixels from the captured image.

5. The imaging apparatus according to claim 1, wherein the part is identified according to a result of image analysis of the captured image.

6. The imaging apparatus according to claim 1, wherein the circuitry is further configured to extract the part from the captured image.

7. The imaging apparatus according to claim 6, wherein the circuitry is further configured to extract a focused part of the captured image in reference to focus information.

8. The imaging apparatus according to claim 6, wherein the circuitry is further configured to extract the part from the captured image according to a result of image analysis of the captured image.

9. The imaging apparatus according to claim 1, wherein the circuitry is further configured to generate the hash value by using the part of the captured image and the part identification information, and link the captured image with the hash value.

10. The imaging apparatus according to claim 1, wherein the circuitry is further configured to
update metadata of the captured image by using the part identification information, and
apply, to the captured image, the metadata, to link the metadata with the captured image.

11. The imaging apparatus according to claim 1, wherein the circuitry is further configured to link the captured image with a public key used to generate an electronic signature and a certificate for the public key.

12. The imaging apparatus according to claim 1, wherein the circuitry is further configured to link, only for an I frame of the moving image, the captured image with the hash value for the part of the captured image and the part identification information.

13. The imaging apparatus according to claim 1, wherein, in a continuous shooting mode, the circuitry is further configured to link the captured image with the hash value for the part of the captured image and the part identification information, and,
in a mode other than the continuous shooting mode, the circuitry is further configured to link the captured image with a hash value for the entire captured image.

14. An information processing method comprising:
linking a captured image with a hash value for a part of the captured image and part identification information for identifying the part, the captured image being a moving image;
generating an electronic signature by using a private key to encrypt the hash value; and
linking the captured image with the electronic signature, wherein
the linking of the captured image includes selecting only frames of the moving image in which movement is higher than movement of a preceding frame of the moving image by a predetermined threshold, and linking, for only the selected frames, the captured image with the hash value for the part of the captured image and the part identification information.

15. A non-transitory computer-readable medium having embodied thereon a program, which when executed by a computer causes the computer to execute an information processing method, the method comprising:
linking a captured image with a hash value for a part of the captured image and part identification information for identifying the part, the captured image being a moving image;
generating an electronic signature by using a private key to encrypt the hash value; and
linking the captured image with the electronic signature, wherein
the linking of the captured image includes selecting only frames of the moving image in which movement is higher than movement of a preceding frame of the moving image by a predetermined threshold, and linking, for only the selected frames, the captured image with the hash value for the part of the captured image and the part identification information.

* * * * *